(12) United States Patent
Zhi

(10) Patent No.: US 12,189,916 B2
(45) Date of Patent: Jan. 7, 2025

(54) ICON DISPLAYING METHOD AND TERMINAL DEVICE

(71) Applicant: VIVO MOBILE COMMUNICATION CO., LTD., Guangdong (CN)

(72) Inventor: Xiaodong Zhi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 14 days.

(21) Appl. No.: 17/535,535

(22) Filed: Nov. 24, 2021

(65) Prior Publication Data
US 2022/0083203 A1 Mar. 17, 2022

Related U.S. Application Data

(63) Continuation of application No. PCT/CN2020/080430, filed on Mar. 20, 2020.

(30) Foreign Application Priority Data

May 29, 2019 (CN) .......................... 201910458667.9

(51) Int. Cl.
*G06F 3/00* (2006.01)
*G06F 3/04817* (2022.01)
(Continued)

(52) U.S. Cl.
CPC ........ *G06F 3/04817* (2013.01); *G06F 3/0482* (2013.01); *G06F 3/04845* (2013.01)

(58) Field of Classification Search
CPC . G06F 3/04817; G06F 3/0482; G06F 3/04845
See application file for complete search history.

(56) References Cited

U.S. PATENT DOCUMENTS 8,365,084 B1 * 1/2013 Lin .................... H04N 21/4312
715/728
8,661,369 B2 * 2/2014 Heo ...................... G06F 3/0481
345/173

(Continued)

FOREIGN PATENT DOCUMENTS

CN 103902163 A 7/2014
CN 104731458 A 6/2015
(Continued)

OTHER PUBLICATIONS

International Search Report of International Application No. PCT/CN2020/080430 mailed on Jun. 28, 2020.
(Continued)

*Primary Examiner* — Brett A Feeney
*Assistant Examiner* — Andrew Chung
(74) *Attorney, Agent, or Firm* — IP & T GROUP LLP

(57) ABSTRACT

An icon display method includes: receiving a first input performed by a user on a target icon, where the target icon is an icon on at least one first interface; and in response to the first input, displaying the target icon on a second interface in a case that a target quantity reaches a target value. The target quantity is a quantity of icons displayed in fixed icon placeholders on the second interface, and the target value is a quantity of fixed icon placeholders on the second interface. After the target icon is displayed on the second interface, P icons on the second interface are located in non-fixed icon placeholders, P is a quantity of target icons, and P is a positive integer.

15 Claims, 19 Drawing Sheets

(51) Int. Cl.
*G06F 3/0482* (2013.01)
*G06F 3/04845* (2022.01)

(56) References Cited

U.S. PATENT DOCUMENTS

| | | | |
|---|---|---|---|
| 2004/0150664 A1* | 8/2004 | Baudisch | G06F 3/04883 715/740 |
| 2009/0058821 A1* | 3/2009 | Chaudhri | G06F 3/04842 345/173 |
| 2010/0293508 A1 | 11/2010 | Hwang et al. | |
| 2012/0066630 A1* | 3/2012 | Kim | G06F 3/0488 715/810 |
| 2012/0124513 A1 | 5/2012 | Shim et al. | |
| 2013/0019193 A1* | 1/2013 | Rhee | G06F 3/04886 715/764 |
| 2013/0055127 A1* | 2/2013 | Saito | G06F 16/168 715/810 |
| 2013/0127896 A1* | 5/2013 | Park | G09G 5/377 345/592 |
| 2013/0241828 A1 | 9/2013 | VanBlon et al. | |
| 2014/0013254 A1* | 1/2014 | Hosein | G06F 3/04883 715/765 |
| 2014/0125692 A1* | 5/2014 | Cheon | G06F 3/017 345/619 |
| 2014/0195964 A1 | 7/2014 | Park | |
| 2014/0237376 A1* | 8/2014 | Cassano | G06F 9/451 715/744 |
| 2014/0245203 A1* | 8/2014 | Lee | G06F 3/04845 715/765 |
| 2015/0128077 A1 | 5/2015 | Cha et al. | |
| 2015/0193416 A1 | 7/2015 | Hagiwara et al. | |
| 2016/0188161 A1 | 6/2016 | Toussaint et al. | |
| 2016/0253059 A1* | 9/2016 | Choi | G06F 3/0483 715/776 |
| 2017/0336944 A1* | 11/2017 | Liu | G06F 3/04883 |
| 2018/0081398 A1* | 3/2018 | Shin | G09G 5/005 |
| 2018/0307388 A1* | 10/2018 | Chaudhri | H04M 1/72469 |
| 2018/0335937 A1* | 11/2018 | Hauenstein | G06F 3/0482 |
| 2018/0335939 A1* | 11/2018 | Karunamuni | G06F 3/0481 |
| 2019/0179500 A1* | 6/2019 | Kim | G06F 3/048 |

FOREIGN PATENT DOCUMENTS

| | | |
|---|---|---|
| CN | 105843480 A | 8/2016 |
| CN | 106155792 A | 11/2016 |
| CN | 106873842 A | 6/2017 |
| CN | 107111418 A | 8/2017 |
| CN | 107247557 A | 10/2017 |
| CN | 107329656 A | 11/2017 |
| CN | 107562312 A | 1/2018 |
| CN | 107704157 A | 2/2018 |
| CN | 109375858 A | 2/2019 |
| CN | 110262713 A | 9/2019 |

OTHER PUBLICATIONS

Written Opinion of The International Searching Authority of International Application No. PCT/CN2020/080430 mailed on Jun. 28, 2020.
First Office Action of Priority Application No. 201910458667.9 mailed on Aug. 28, 2020.

* cited by examiner

ICON DISPLAYING METHOD AND TERMINAL DEVICE

CROSS-REFERENCE TO RELATED APPLICATIONS

This application is a Bypass Continuation Application of PCT/CN2020/080430, filed on Mar. 20, 2020, which claims priority to Chinese Patent Application No. 201910458667.9, filed on May 29, 2019, which are incorporated herein by reference in their entirety.

TECHNICAL FIELD

Embodiments of the present disclosure relate to the field of communications technologies, and in particular, to an icon display method and a terminal device.

BACKGROUND

With continuous development of terminal technologies, more and more application programs may be installed on a terminal device, and an icon of each application program may be displayed in a fixed icon placeholder on each interface of a desktop of the terminal device.

SUMMARY

Embodiments of the present disclosure provide an icon display method and a terminal device.

According to a first aspect, an embodiment of the present disclosure provides an icon display method, where the method is applied to a terminal device, and the method includes: receiving a first input performed by a user on a target icon, where the target icon is an icon on at least one first interface; and in response to the first input, displaying the target icon on a second interface in a case that a target quantity reaches a target value, where the target quantity is a quantity of icons displayed in fixed icon placeholders on the second interface, and the target value is a quantity of fixed icon placeholders on the second interface, where after the target icon is displayed on the second interface, P icons on the second interface are located in non-fixed icon placeholders, P is a quantity of target icons, and P is a positive integer.

According to a second aspect, an embodiment of the present disclosure provides a terminal device, including a receiving module and a display module. The receiving module is configured to receive a first input performed by a user on a target icon, where the target icon is an icon on at least one first interface; and the display module is configured to: in response to the first input received by the receiving module, in a case that a target quantity reaches a target value, display the target icon on a second interface, where the target quantity is a quantity of icons displayed in fixed icon placeholders on the second interface, and the target value is a quantity of fixed icon placeholders on the second interface; and after the display module displays the target icon on the second interface, P icons on the second interface are located in non-fixed icon placeholders, P is a quantity of target icons, and P is a positive integer.

According to a third aspect, an embodiment of the present disclosure provides a terminal device, including a processor, a memory, and a computer program that is stored in the memory and executable on the processor, where when the computer program is executed by the processor, the steps of the icon display method in the first aspect are implemented.

According to a fourth aspect, an embodiment of the present disclosure provides a non-transitory computer-readable storage medium, where the non-transitory computer-readable storage medium stores a computer program, and when the computer program is executed by a processor, the steps of the icon display method in the first aspect are implemented.

DESCRIPTION OF EMBODIMENTS

Figure 1:
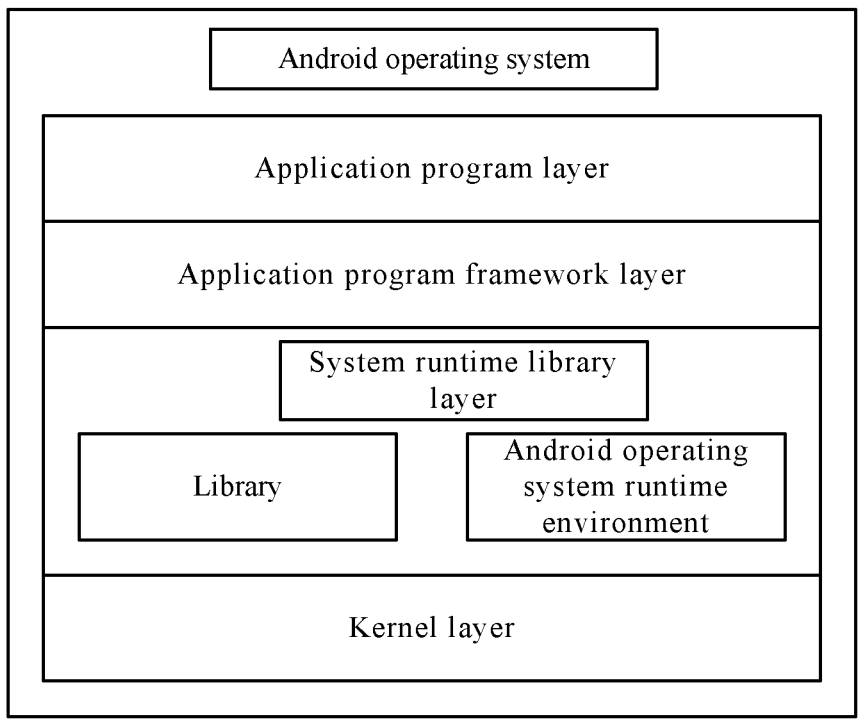
FIG. 1 is a schematic architectural diagram of a possible Android operating system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of the present disclosure, the terms "first", "second", "third", "fourth", and so on are intended to distinguish between different objects but do not describe a particular order of the objects. For example, a first interface, a second interface, and the like are intended to distinguish between different interfaces, instead of describing a particular order of the interfaces.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. Optionally, the words such as "exemplary" or "for example" are used to present related concepts in a specific manner.

In the descriptions of the embodiments of the present disclosure, unless otherwise stated, "a plurality of" means two or more, for example, a plurality of interfaces mean two or more interfaces.

The following first explains some nouns or terms in the claims and the specification of the present disclosure.

A fixed icon placeholder is a plurality of icon display areas on each interface of a desktop of a terminal device, and one icon may be displayed in each icon display area. Generally, a quantity and a location of a fixed icon placeholder on each interface of the desktop are fixed. When an icon is displayed in a fixed icon placeholder, a user may operate the icon to trigger the terminal device to open an application program or a folder corresponding to the icon.

A non-fixed icon placeholder is another area in each interface of the desktop of the terminal device other than a fixed icon placeholder. In this embodiment of the present disclosure, when the desktop of the terminal device is in an icon editable state, a non-fixed icon placeholder on each interface of the desktop may be used as a temporary icon placeholder. Optionally, when the desktop of the terminal device is in an icon editable state, the user may trigger the terminal device to temporarily display an icon in the non-fixed icon placeholder. It should be noted that the user may perform operations such as movement, deletion, and merging display (that is, merging a plurality of icons into one folder for display) on the icon displayed in the non-fixed icon placeholder. However, the icon displayed in the non-fixed icon placeholder cannot be operated to trigger the terminal device to open an application program or a folder corresponding to the icon.

The icon editable state means that an icon is in an editable state. Optionally, in this state, the user may trigger the terminal device to perform operations such as movement, deletion, and merging display on the icon.

It can be understood that the icon in the embodiments of the present disclosure may be used to indicate an application program, or may be used to indicate a folder, that is, the icon in the embodiments of the present disclosure may be an icon of an application program, or may be an icon of a folder. For example, a first icon may be an icon of an application program, or may be an icon of a folder.

It should be noted that, in the embodiments of the present disclosure, description and examples of the application program are all illustrated by using a name of the application program. A representation form of the application program in the embodiments of the present disclosure is "XX", that is, "XX" represents an XX application program. For example, "Video 1" represents a video 1 application program, and "Tourism 1" represents a tourism 1 application program. In addition, in the embodiments of the present disclosure, "XX" and an XX application program may be interchanged, and both meanings are the same.

Generally, a user may move an icon of the application program from one interface of the desktop of the terminal device to another interface of the desktop based on a use requirement. For example, it is assumed that icons on an interface A of the desktop of the terminal device are full (that is, an icon is displayed on each fixed icon placeholder on the interface A). If the user triggers the terminal device to move an icon of an application program on an interface B of the desktop of the terminal device to an icon placeholder on the interface A, the terminal device may move an icon originally displayed in the icon placeholder to a next icon placeholder, and display the icon of the application program in the icon placeholder. In this way, the terminal device can control icon movement on each interface of the desktop.

However, according to the foregoing method, before the terminal device moves the icon on the interface B to the interface A, icons on the interface A are full. Therefore, after the terminal device moves the icon on the interface B to the interface A, the icon originally displayed on the interface A is squeezed out, and the squeezed icon may be randomly arranged on any interface of the desktop of the terminal device. Consequently, the icon may not be found in time and quickly.

Embodiments of the present disclosure provide an icon display method and a terminal device. The terminal device may receive a first input performed by a user on a target icon (an icon on at least one first interface); and in response to the first input, display the target icon on a second interface in a case that a target quantity (a quantity of icons displayed in fixed icon placeholders on the second interface) reaches a target value (a quantity of fixed icon placeholders on the second interface), where after the target icon is displayed on the second interface, P icons on the second interface are located in non-fixed icon placeholders, P is a quantity of target icons, and P is a positive integer. In this solution, when icons on an interface in the terminal device are full (a quantity of icons displayed in fixed icon placeholders on the interface reaches a quantity of fixed icon placeholders on the interface), in the embodiments of the present disclosure, an icon may be further displayed in a temporary icon placeholder (a non-fixed icon placeholder) on the interface, so that the interface can display a larger quantity of icons than the quantity of fixed icon placeholders on the interface. Therefore, a problem that some icons are squeezed out due to moving of an icon can be avoided, so that flexibility of displaying an icon by the terminal device can be improved, convenience of using the terminal device by the user can be improved, and human-machine interaction performance can be improved.

It should be noted that in the embodiments of the present disclosure, that the terminal device displays an icon in a temporary icon placeholder (a non-fixed icon placeholder) on an interface may include: the terminal device displays, in the temporary icon placeholder on the interface, an icon triggered by a user to move (an icon moved from another interface to the interface); or the terminal device replaces an icon originally displayed in a fixed icon placeholder on the interface with an icon triggered by a user to move, and displays the originally displayed icon in the temporary icon placeholder on the interface.

The terminal device in the embodiments of the present disclosure may be a terminal device with an operating system. The operating system may be an Android operating system, an iOS operating system, or another possible operating system. This is not specifically limited in the embodiments of the present disclosure.

The following uses the Android operating system as an example to describe a software environment to which the icon display method provided in the embodiments of the present disclosure is applied.

As shown in FIG. 1, FIG. 1 is a schematic architectural diagram of a possible Android operating system according to an embodiment of the present disclosure. In FIG. 1, the architecture of the Android operating system includes 4 layers, namely: an application program layer, an application program framework layer, a system runtime library layer, and a kernel layer (it may be the Linux kernel layer).

The application layer includes various application programs in the Android operating system (including system application programs and third-party application programs).

The application program framework layer is an application program framework, and the developer may develop some application programs based on the application program framework layer when following a development rule of the application program framework.

The system runtime library layer includes a library (also referred to as a system library) and an Android operating system runtime environment. The library mainly provides various resources required for the Android operating system. The Android operating system runtime environment is used to provide the Android operating system with a software environment.

The kernel layer is an operating system layer of the Android operating system, and is a lowest layer of software levels of the Android operating system. The kernel layer provides the Android operating system with a core system service and a hardware-related driver based on the Linux kernel.

The Android operating system is used as an example. In the embodiments of the present invention, a developer may develop, based on the system architecture of the Android operating system shown in FIG. 1, a software program to implement the icon display method provided in the embodiments of the present invention, so that the icon display method can run based on the Android operating system shown in FIG. 1. That is, a processor or the terminal device may run the software program in the Android operating system to implement the icon display method provided in the embodiments of the present disclosure.

The terminal device in the embodiments of the present disclosure may be a mobile terminal, or may be a non-mobile terminal. For example, the mobile terminal may be a mobile phone, a tablet computer, a laptop computer, a palmtop computer, an in-vehicle terminal, a wearable device, an ultra-mobile personal computer (UMPC), a netbook, or a personal digital assistant (PDA). The non-mobile terminal may be a personal computer (PC), a television (TV), an automated teller machine or a self-service machine. This is not specifically limited in the embodiments of the present disclosure.

The icon display method provided in the embodiments of the present disclosure may be performed by the foregoing terminal device, or a functional module and/or a functional entity that can implement the icon display method in the terminal device. Specifically, this may be determined based on an actual use requirement, and is not limited in this embodiment of the present disclosure. Taking the terminal device as an example, the following describes the icon display method provided in the embodiments of the present disclosure.

In the embodiments of the present disclosure, when a quantity of icons displayed on an interface (hereinafter referred to as an interface C) of the desktop of the terminal device reaches a quantity of fixed icon placeholders on the interface C (icons on the interface C are full), and the user needs to move an icon (hereinafter referred to as an icon 1) displayed on another interface (hereinafter referred to as an interface D) of the desktop of the terminal device to the interface C, the user may first trigger the terminal device to control the desktop of the terminal device to be in an icon editable state (for example, the user may perform the triggering by touching and holding any icon in the desktop of the terminal device), and then the user may drag the icon 1 from the interface D to the interface C. In this case, because the icons on the interface C are full, the terminal device may display the icon 1 in a temporary icon placeholder (a non-fixed icon placeholder) on the interface C, or the terminal device may replace an icon originally displayed in a fixed icon placeholder on the interface C with the icon 1, and display the originally displayed icon in the temporary icon placeholder on the interface C. Then the user may continue to move another icon into the interface C, and after the user operates and arranges icons (including the icon originally displayed on the interface C and the icon moved into the interface C) on the interface C, the user may further trigger the terminal device to move the icon displayed in the non-fixed icon placeholder on the interface C to a fixed icon placeholder on another interface for display. In this way, when icons on an interface are full, in the embodiments of the present disclosure, an icon may be displayed in a temporary icon placeholder (a non-fixed icon placeholder) on the interface, so that the interface can display a larger quantity of icons than the quantity of fixed icon placeholders on the interface. Therefore, a problem that some icons are squeezed out due to moving of an icon can be avoided, so that flexibility of displaying an icon by the terminal device can be improved, convenience of using the terminal device by the user can be improved, and human-machine interaction performance can be improved.

The following describes the icon display method provided in the embodiments of the present disclosure with reference to the accompanying drawings.

Figure 2:
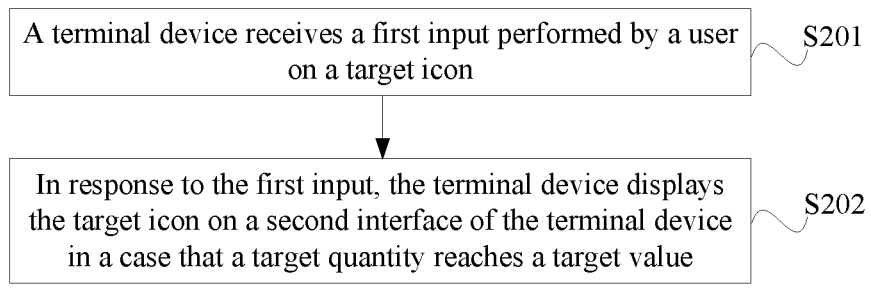
FIG. 2 is a first schematic diagram of an icon display method according to an embodiment of the present disclosure.

As shown in FIG. 2, an embodiment of the present disclosure provides an icon display method. The method may include the following S201 and S202.

S201. A terminal device receives a first input performed by a user on a target icon.

The target icon may be an icon on at least one first interface of a desktop of the terminal device. It can be understood that in this embodiment of the present disclosure, the at least one first interface may be one interface (that is, moving an icon from one interface to another interface, for example, the following second interface), or may be a plurality of interfaces (that is, moving an icon from a plurality of interfaces to the second interface). Specifically, this may be determined based on an actual use requirement, and is not limited in this embodiment of the present disclosure. It should be noted that, to facilitate description and understanding of the implementations of this embodiment of the present disclosure, if no special description is provided, the at least one first interface in this embodiment of the present disclosure is described by using one interface as an example.

Optionally, in this embodiment of the present disclosure, there may be one or more target icons. Specifically, this may be determined based on an actual use requirement, and is not limited in this embodiment of the present disclosure. It should be noted that, to facilitate description and understanding of the implementations of this embodiment of the present disclosure, if no special description is provided, the target icon in this embodiment of the present disclosure is described by using one icon as an example.

It can be understood that when the at least one first interface is one interface, there may be one or more target icons. When the at least one first interface is a plurality of interfaces, there is a plurality of target icons.

Optionally, in this embodiment of the present disclosure, the target icon may be an icon of an application program, or may be an icon of a folder (including icons of a plurality of application programs). Specifically, this may be determined based on an actual use requirement, and is not limited in this embodiment of the present disclosure.

Optionally, in this embodiment of the present disclosure, the first input may be a drag input performed by the user on the target icon (which may be a drag from the at least one first interface to the second interface), or may be any other input that may trigger moving of the target icon. Specifically, this may be determined based on an actual use requirement, and is not limited in this embodiment of the present disclosure.

Optionally, in this embodiment of the present disclosure, before the user performs the first input on the target icon, the user may first trigger, through one input (for example, the following target input), the desktop of the terminal device to be in an icon editable state. It can be understood that, after the desktop of the terminal device is in an icon editable state, each interface of the desktop is in an icon editable state, that is, when the desktop is in an icon editable state, icons on each interface of the desktop can be edited (for example, moved, deleted, or merged for display).

It should be noted that, that the desktop of the terminal device is in an icon editable state means that an icon in the desktop is in an editable state, that is, the user may trigger the terminal device to perform operations such as movement, deletion, and merging for display on the icon in the desktop.

Optionally, that the desktop of the terminal device is in an icon editable state may be implemented by using the following S201a and S201b.

S201a. The terminal device receives a target input performed by the user.

S201b. In response to the target input, the terminal device controls a desktop of the terminal device to be in an icon editable state.

Optionally, in this embodiment of the present disclosure, the target input may be an input performed by the user in any area in the desktop. For example, the target input may be an input performed by the user on any icon in the desktop, or may be an input performed by the user in a blank area (that is, an area in which no icon, no widget, or no gadget is displayed) in the desktop. Specifically, this may be determined based on an actual use requirement, and is not limited in this embodiment of the present disclosure.

Optionally, in this embodiment of the present disclosure, the target input may be an input in any possible form, such as a click input, a touch and hold input, a re-press input, or a slide input. Specifically, this may be determined based on an actual use requirement, and is not limited in this embodiment of the present disclosure.

For example, the click input may be a single-click input, a double-click input, or an input in which a preset quantity of times of clicking is continuously performed. The touch and hold input may be an input of contact performed for a first preset time. The re-press input is also referred to as a pressure touch input, and is an input performed by the user by using a pressure value greater than or equal to a pressure threshold. The slide input may be a slide input in any direction.

It should be noted that the preset quantity of times, the first preset time, and the pressure threshold may be determined based on an actual use requirement, and are not limited in this embodiment of the present disclosure.

S202. In response to the first input, the terminal device displays the target icon on a second interface of the terminal device in a case that a target quantity reaches a target value.

The target quantity may be a quantity of icons displayed in fixed icon placeholders on the second interface, and the target value may be a quantity of fixed icon placeholders on the second interface. In addition, after the terminal device displays the target icon on the second interface, P icons on the second interface are located in non-fixed icon placeholders, P is a quantity of target icons, and P is a positive integer.

It should be noted that, in this embodiment of the present disclosure, the second interface may be an interface of the desktop of the terminal device. The second interface may be an interface different from the at least one first interface.

In this embodiment of the present disclosure, when icons on the second interface are full (that is, a quantity of icons on the second interface reaches a quantity of fixed icon placeholders on the second interface), if the user triggers the terminal device to move an icon (for example, the target icon) from another interface (for example, the at least one first interface) to the second interface, the terminal device may display, in a temporary icon placeholder (a non-fixed icon placeholder) on the second interface, an icon triggered by the user to move, or the terminal device may replace an icon originally displayed in a fixed icon placeholder on the second interface with the icon triggered by the user to move, and display the originally displayed icon in the temporary icon placeholder on the second interface, so that more icons can be displayed on the second interface, and the user can operate and arrange all icons displayed on the second interface, thereby improving convenience of using the terminal device by the user and improving human-machine interaction performance.

Optionally, in this embodiment of the present disclosure, the P icons may be all icons in the target icons (in this case, there are a plurality of target icons), or may be all icons (hereinafter referred to as original icons) displayed in fixed icon placeholders on the second interface before the terminal device displays the target icon on the second interface, or may be some icons in the target icons and some original icons. Specifically, this may be determined based on an actual use requirement, and is not limited in this embodiment of the present disclosure.

For example, one icon in the target icons (in this case, there are a plurality of target icons) is used as an example. It is assumed that the first input is an input of dragging the icon from the at least one first interface to the second interface by the user. In this case, when the user drags the icon from the at least one first interface to the second interface, if the user drags the icon to an end location on the second interface that is not in identification ranges of all fixed icon placeholders, the icon may be displayed in a non-fixed icon placeholder on the second interface. In this case, the P icons may include the icon. If the user drags the icon to an end location on the second interface that is in an identification range of a fixed icon placeholder, the icon may be displayed in the fixed icon placeholder, and an icon originally displayed in the fixed icon placeholder may be squeezed to a non-fixed icon placeholder on the second interface to be displayed. In this case, the P icons may include the icon originally displayed in the fixed icon placeholder.

A specific manner in which the terminal device displays the target icon on the second interface is described in detail in the following embodiment. Details are not described herein.

Optionally, in this embodiment of the present disclosure, when displaying an icon in a fixed icon placeholder and an icon in a non-fixed icon placeholder, the terminal device may perform display through distinguishing in a preset manner. In this way, the icon in the fixed icon placeholder and the icon in the non-fixed icon placeholder can be better distinguished, thereby facilitating the user's operation, and further improving human-computer interaction performance.

Optionally, in this embodiment of the present disclosure, the preset manner may be at least one of the following: performing display through distinguishing by using different icon sizes, performing display through distinguishing by using different colors, or performing display through distinguishing by using different dynamic special effects. It can be understood that in this embodiment of the present disclosure, the terminal device may separately display the icon in the fixed icon placeholder and the icon in the non-fixed icon placeholder in any one of the foregoing preset manners; or the terminal device may separately display the icon in the fixed icon placeholder and the icon in the non-fixed icon placeholder in any two or more of the foregoing preset manners. Specifically, this may be determined based on an actual use requirement, and is not limited in this embodiment of the present disclosure.

According to the icon display method provided in this embodiment of the present disclosure, when icons on an interface in the terminal device are full (a quantity of icons displayed in fixed icon placeholders on the interface reaches a quantity of fixed icon placeholders on the interface), in this embodiment of the present disclosure, an icon may be further displayed in a temporary icon placeholder (a non-fixed icon placeholder) on the interface, so that the interface can display a larger quantity of icons than the quantity of fixed icon placeholders on the interface. Therefore, a problem that some icons are squeezed out due to moving of an icon can be avoided, so that flexibility of displaying an icon by the terminal device can be improved, convenience of using the terminal device by the user can be improved, and human-machine interaction performance can be improved.

Optionally, in this embodiment of the present disclosure, when a quantity of icons displayed in fixed icon placeholders on the second interface reaches a quantity of fixed icon placeholders on the second interface (that is, the target quantity reaches the target value, or in other words, icons on the second interface are full), if the user triggers, through the first input, the terminal device to move the target icon on the at least one first interface to the second interface, a display location of the target icon on the second interface may vary due to different end locations of the first input. Optionally, in a first possible implementation, when the end location of the first input is in an identification range of a fixed icon placeholder on the second interface, the display location of the target icon on the second interface is the fixed icon placeholder (an icon originally displayed in the fixed icon placeholder is squeezed to a non-fixed icon placeholder for display). In a second possible implementation, when the end location of the first input is not in identification ranges of all fixed icon placeholders on the second interface, the display location of the target icon in the second interface is a non-fixed icon placeholder.

It should be noted that in this embodiment of the present disclosure, the identification range of the fixed icon placeholder may be an area around the fixed icon placeholder. For example, the identification range may be an area with a center of the fixed icon placeholder as a center point and a radius greater than a radius of the fixed icon placeholder, or may be an area formed by an area in which the fixed icon placeholder is located and an extended area extending along an edge of the fixed icon placeholder. Specifically, this may be determined based on an actual use requirement, and is not limited in this embodiment of the present disclosure.

In this embodiment of the present disclosure, when an icon squeezes an icon in a fixed icon placeholder (an icon originally displayed in the fixed icon placeholder), the icon originally displayed in the fixed icon placeholder may be displayed in a non-fixed icon placeholder, and an icon in another fixed icon placeholder is not squeezed out as in the related art, so that more icons can be displayed on an interface, thereby improving flexibility of displaying an icon on the interface, and further improving human-computer interaction performance.

The following separately describes the first possible implementation and the second possible implementation.

Figure 3:
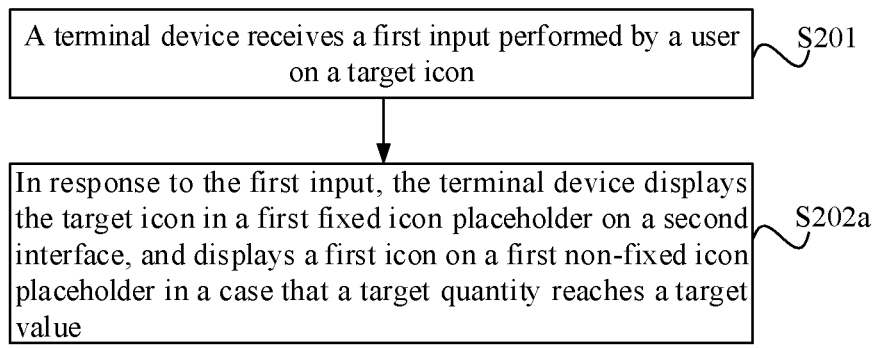
FIG. 3 is a second schematic diagram of an icon display method according to an embodiment of the present disclosure.

In the first possible implementation, with reference to FIG. 2, as shown in FIG. 3, the foregoing S202 may be implemented by using the following S202a.

S202a. In response to the first input, the terminal device displays the target icon in a first fixed icon placeholder on the second interface, and displays a first icon on a first non-fixed icon placeholder in a case that the target quantity reaches the target value.

The first icon may be an icon displayed in the first fixed icon placeholder before the terminal device displays the target icon in the first fixed icon placeholder. That is, the first icon may be an icon originally displayed in the first fixed icon placeholder before the terminal device displays the target icon in the first fixed icon placeholder.

Optionally, in this embodiment of the present disclosure, the first fixed icon placeholder may be a fixed icon placeholder in an identification range in which the end location of the first input is located on the second interface.

Optionally, in this embodiment of the present disclosure, a non-fixed icon placeholder on the second interface may be in any area except each fixed icon placeholder on the second interface. For example, in this embodiment of the present disclosure, the first non-fixed icon placeholder may be in an area near the first fixed icon placeholder on the second interface, or may be in a specific area on the second interface. The specific area on the second interface may be an area that is used to display a widget or a gadget on the second interface (it can be understood that generally, no fixed icon placeholder is set in this area, that is, no icon can be displayed in this area).

Figure 4:
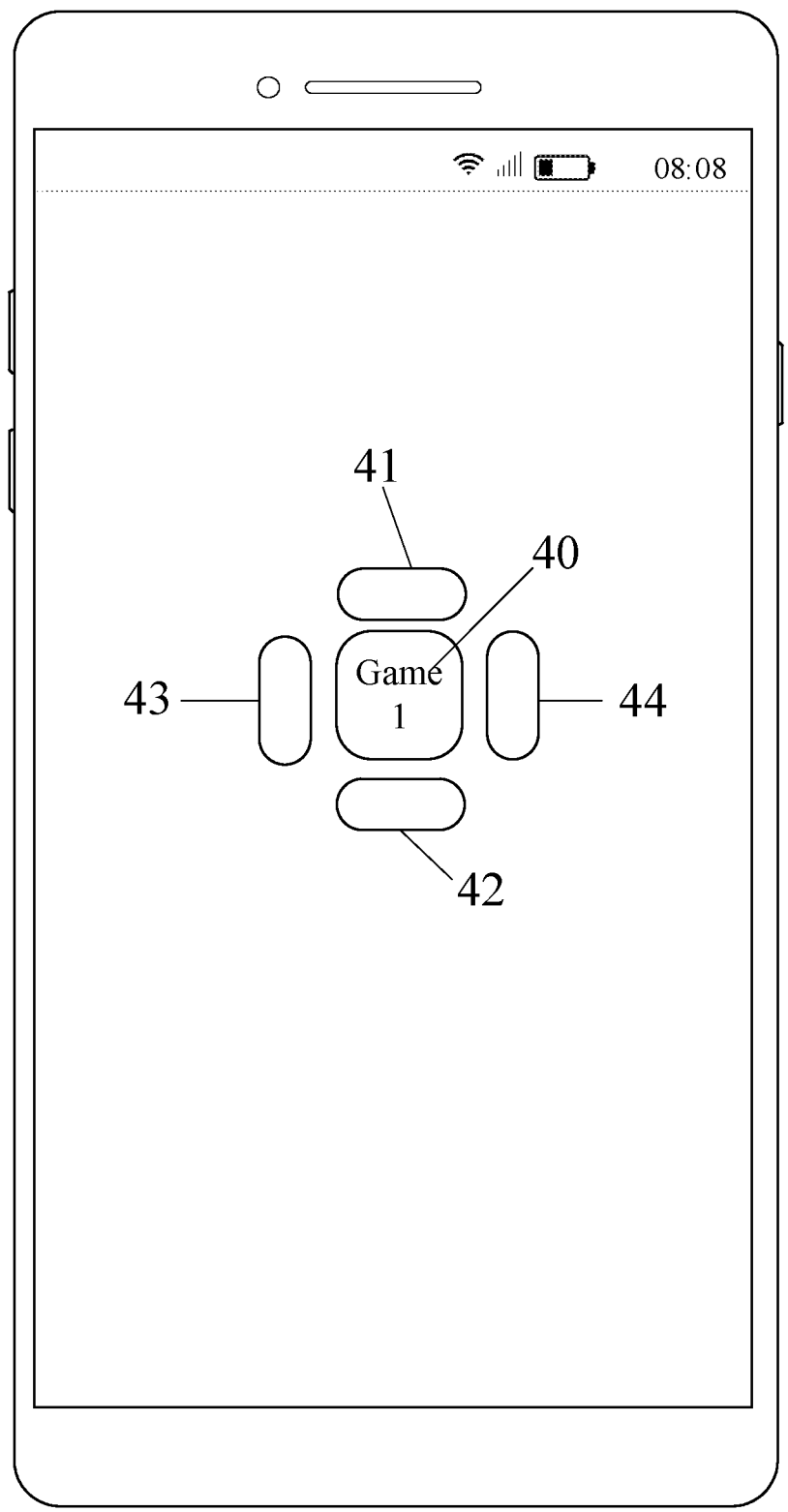
FIG. 4 is a first schematic diagram of an application interface of an icon display method according to an embodiment of the present disclosure.

For example, it is assumed that the first non-fixed icon placeholder is an area near the first fixed icon placeholder. As shown in FIG. 4, the first non-fixed icon placeholder may be in an area (as shown in 41 in FIG. 4) above the first fixed icon placeholder 40 and adjacent to the first fixed icon placeholder 40. The first non-fixed icon placeholder may also be in an area (as shown in 42 in FIG. 4) below the first fixed icon placeholder 40 and adjacent to the first fixed icon placeholder 40. The first non-fixed icon placeholder may also be located in an area (as shown in 43 in FIG. 4) on a left side of the first fixed icon placeholder 40 and adjacent to the first fixed icon placeholder 40. The first non-fixed icon placeholder may also be in an area (as shown in 44 in FIG. 4) on a right side of the first fixed icon placeholder 40 and adjacent to the first fixed icon placeholder 40. Specifically, this may be determined based on an actual use requirement, and is not limited in the embodiments of the present disclosure.

Optionally, a quantity of non-fixed icon placeholders on the second interface is not limited in this embodiment of the present disclosure. Optionally, the quantity of non-fixed icon placeholders on the second interface may be less than the quantity of fixed icon placeholders on the second interface, or may be equal to the quantity of fixed icon placeholders on the second interface, or may be greater than the quantity of fixed icon placeholders on the second interface. Specifically, this may be determined based on an actual use requirement, and is not limited in this embodiment of the present disclosure.

Figure 5A:
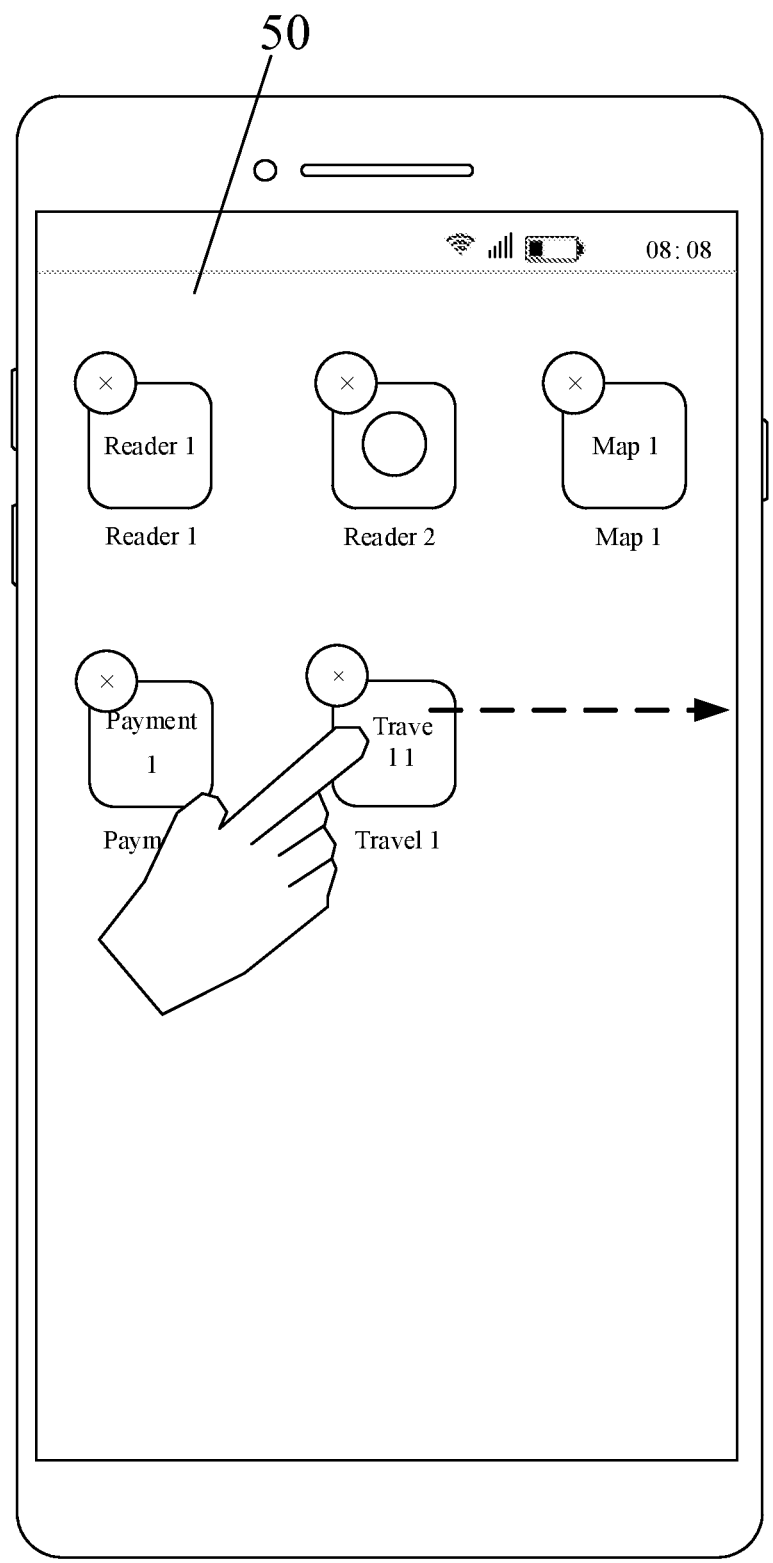
FIG. 5A is a second schematic diagram of an application interface of an icon display method according to an embodiment of the present disclosure.
Figure 5B:
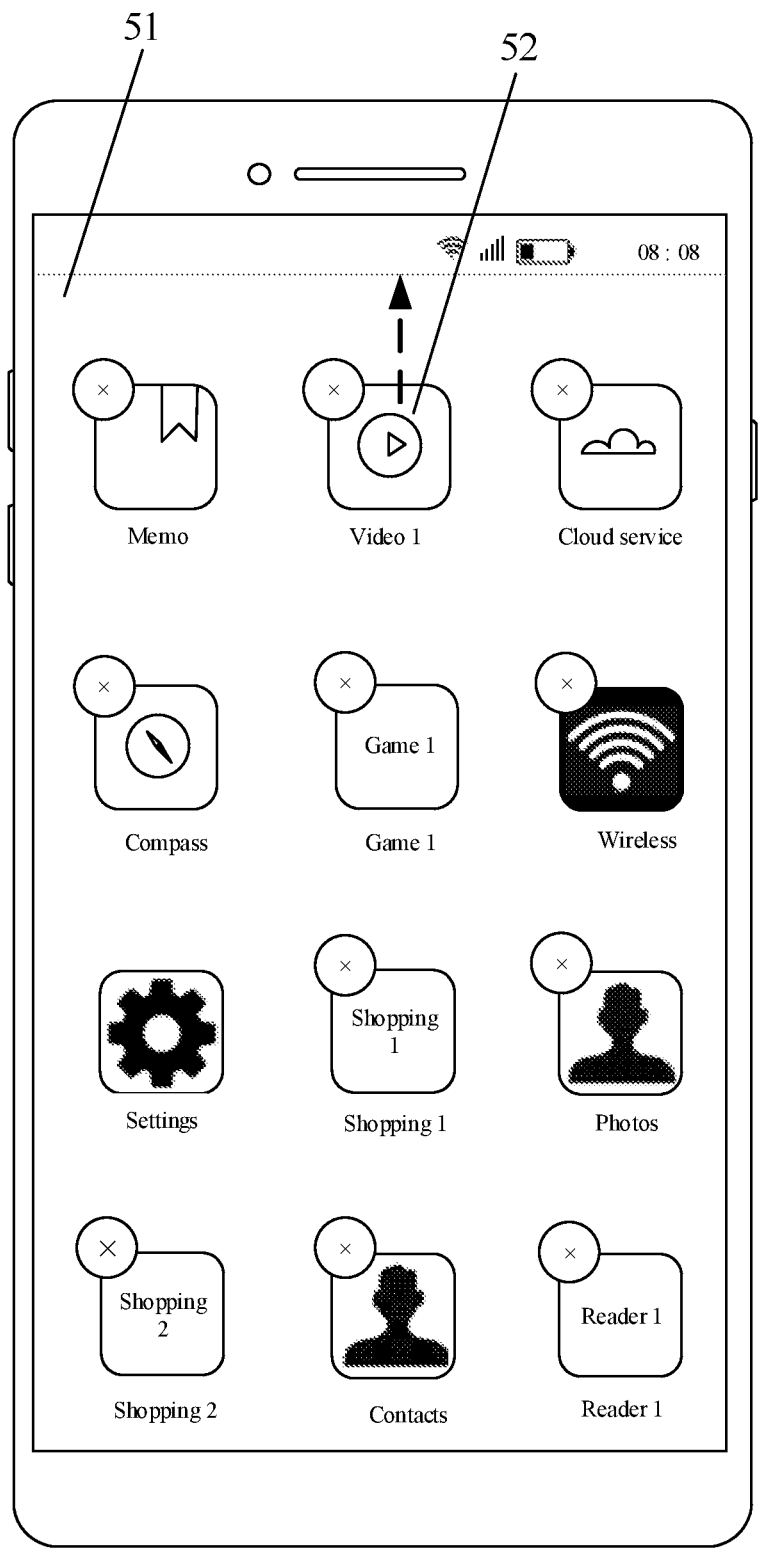
FIG. 5B is a third schematic diagram of an application interface of an icon display method according to an embodiment of the present disclosure.
Figure 5C:
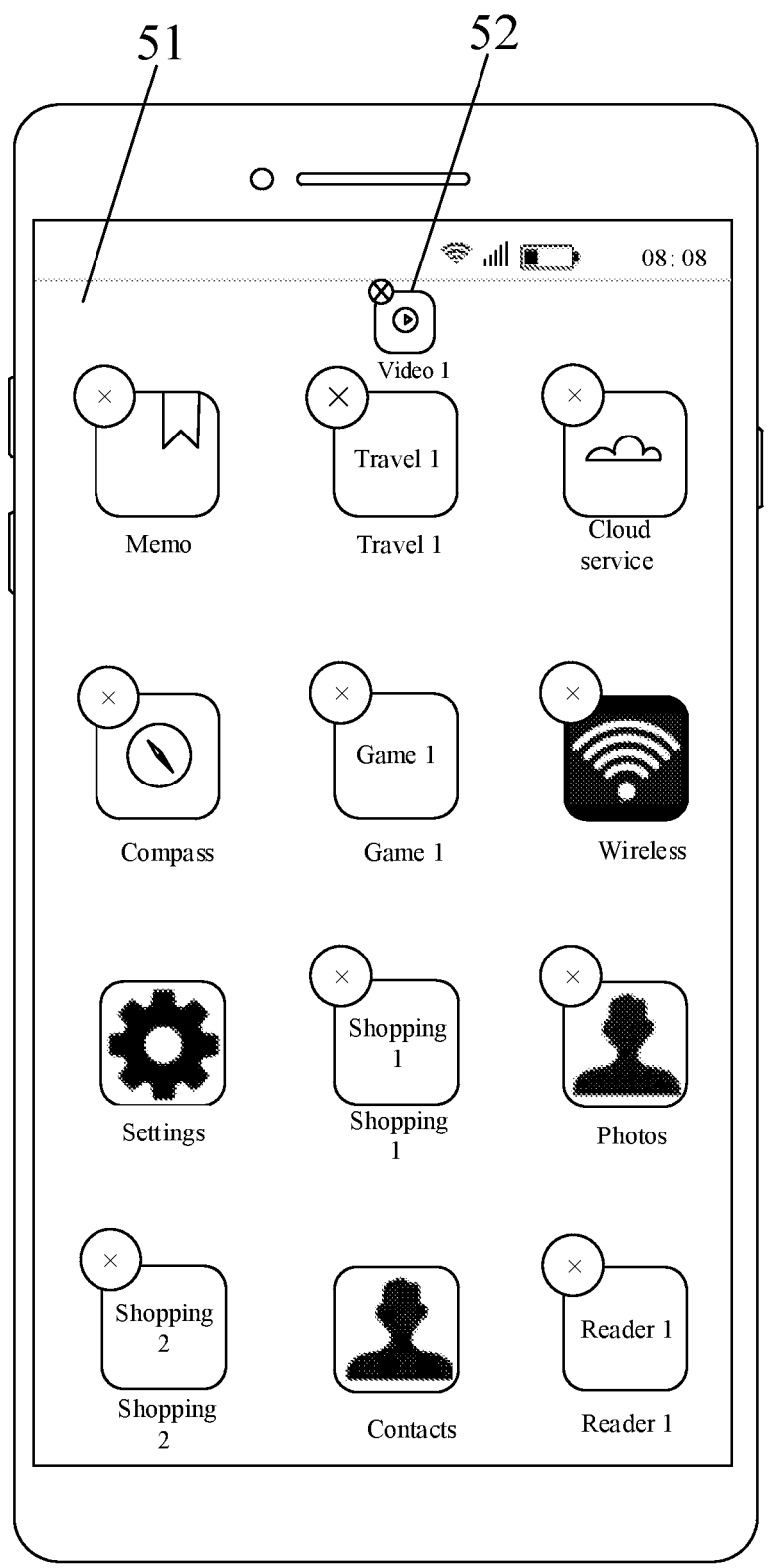
FIG. 5C is a fourth schematic diagram of an application interface of an icon display method according to an embodiment of the present disclosure.

The following further describes the first possible implementation with reference to FIGS. 5A to 5C.

For example, it is assumed that the at least one first interface is an interface of the desktop of the terminal device, the second interface is another interface of the desktop of the terminal device, icons on the second interface are full (that is, a quantity of icons on the second interface reaches the quantity of fixed icon placeholders on the second interface), the user needs to move the target icon on the at least one first interface to the second interface, the first input is a drag input performed by the user on the target icon, the end location of the first input is in an identification range of one fixed icon placeholder on the second interface, and one non-fixed icon placeholder is in an area above a fixed icon placeholder and adjacent to the fixed icon placeholder. After the user triggers, through the target input, the desktop of the terminal device to be in an icon editable state, FIG. 5A shows at least one first interface 50 in an icon editable state, and FIG. 5B shows a second interface 51 in an icon editable state. In this case, the user may drag an icon of "Tourism 1" on the at least one first interface 50 shown in FIG. 5A to the second interface 51 shown in FIG. 5B (that is, the first input). When the user drags the icon of "Tourism 1" to the first fixed icon placeholder (that is, when an icon 52 of "Video 1" shown in FIG. 5B is displayed in an identification range of the fixed icon placeholder), as shown in FIG. 5C, the terminal device may display, in response to the first input, the icon 52 of "Video 1" on the first fixed icon placeholder in an area above the first fixed icon placeholder and adjacent to the first fixed icon placeholder, and display the icon of "Tourism 1" in the first fixed icon placeholder.

In this implementation, when icons on the second interface are full, and the user triggers the target icon on the at least one first interface to move to the second interface, the terminal device may display the target icon in the first fixed icon placeholder on the second interface, and may display the first icon (an icon originally displayed in the first fixed icon placeholder before the terminal device displays the target icon in the first fixed icon placeholder) in the first non-fixed icon placeholder on the second interface. Therefore, the first icon is not squeezed to a next fixed icon placeholder on the second interface, to prevent a display layout of icons in other fixed icon placeholders on the second interface from being disturbed. In this way, a problem that some icons are squeezed out due to moving of an icon can be avoided, so that flexibility of displaying an icon by the terminal device can be improved, convenience of using the terminal device by the user can be improved, and human-machine interaction performance can be improved.

Figure 6:
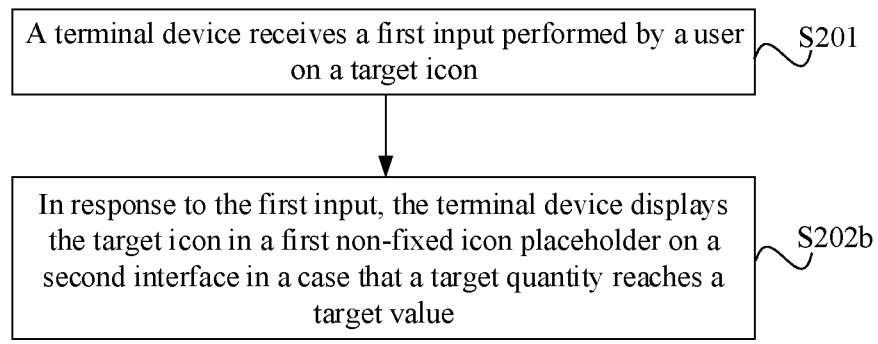
FIG. 6 is a third schematic diagram of an icon display method according to an embodiment of the present disclosure.

In the second possible implementation, with reference to FIG. 2, as shown in FIG. 6, the foregoing S202 may be implemented by using the following S202*b*.

S202*b*. In response to the first input, the terminal device displays the target icon in a first non-fixed icon placeholder on the second interface in a case that the target quantity reaches the target value.

For descriptions of a location of the first non-fixed icon placeholder and a quantity of non-fixed icon placeholders on the second interface, refer to the related descriptions in the foregoing first possible implementation. Details are not described herein again.

Figure 7A:
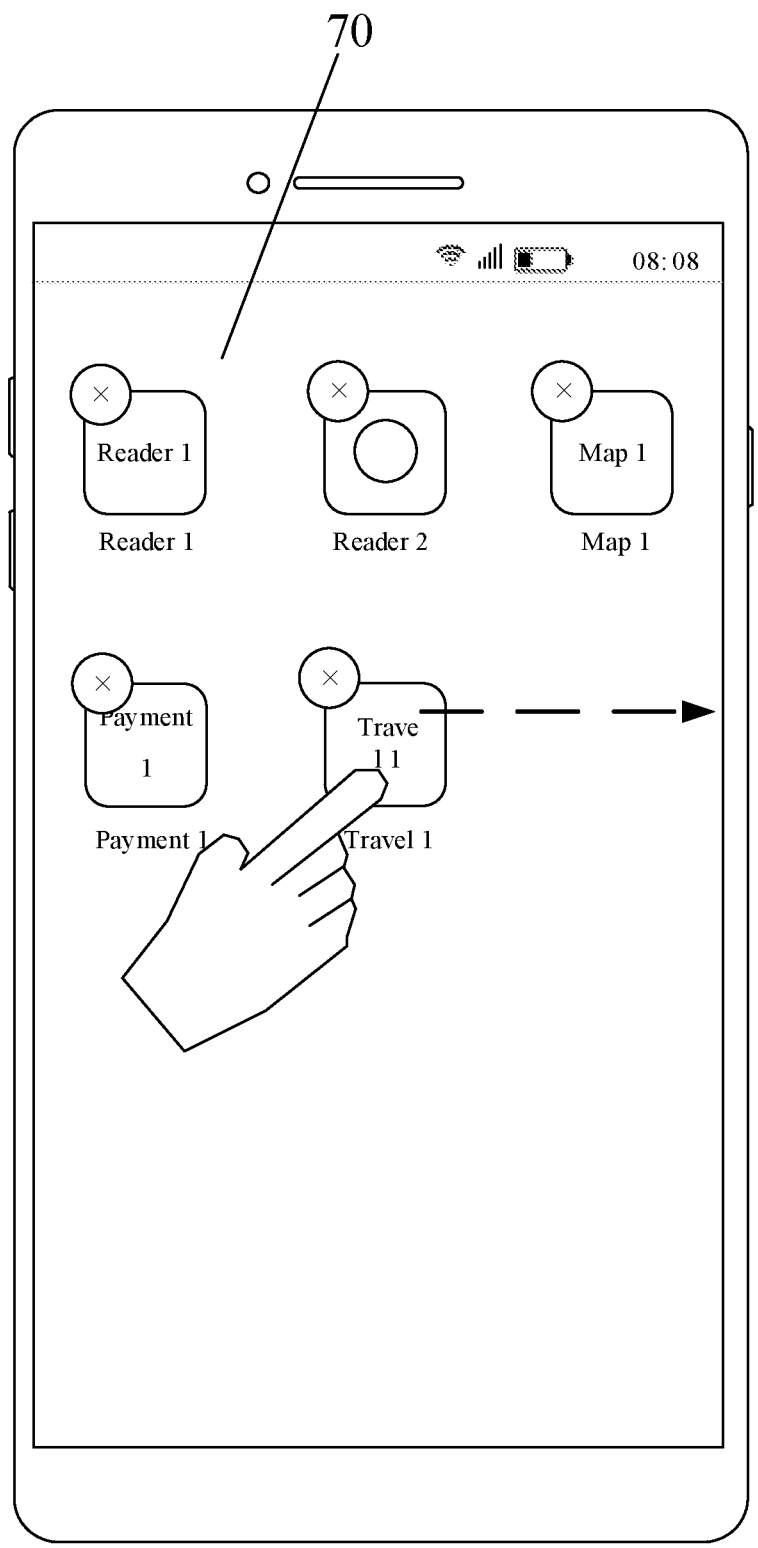
FIG. 7A is a fifth schematic diagram of an application interface of an icon display method according to an embodiment of the present disclosure.
Figure 7B:
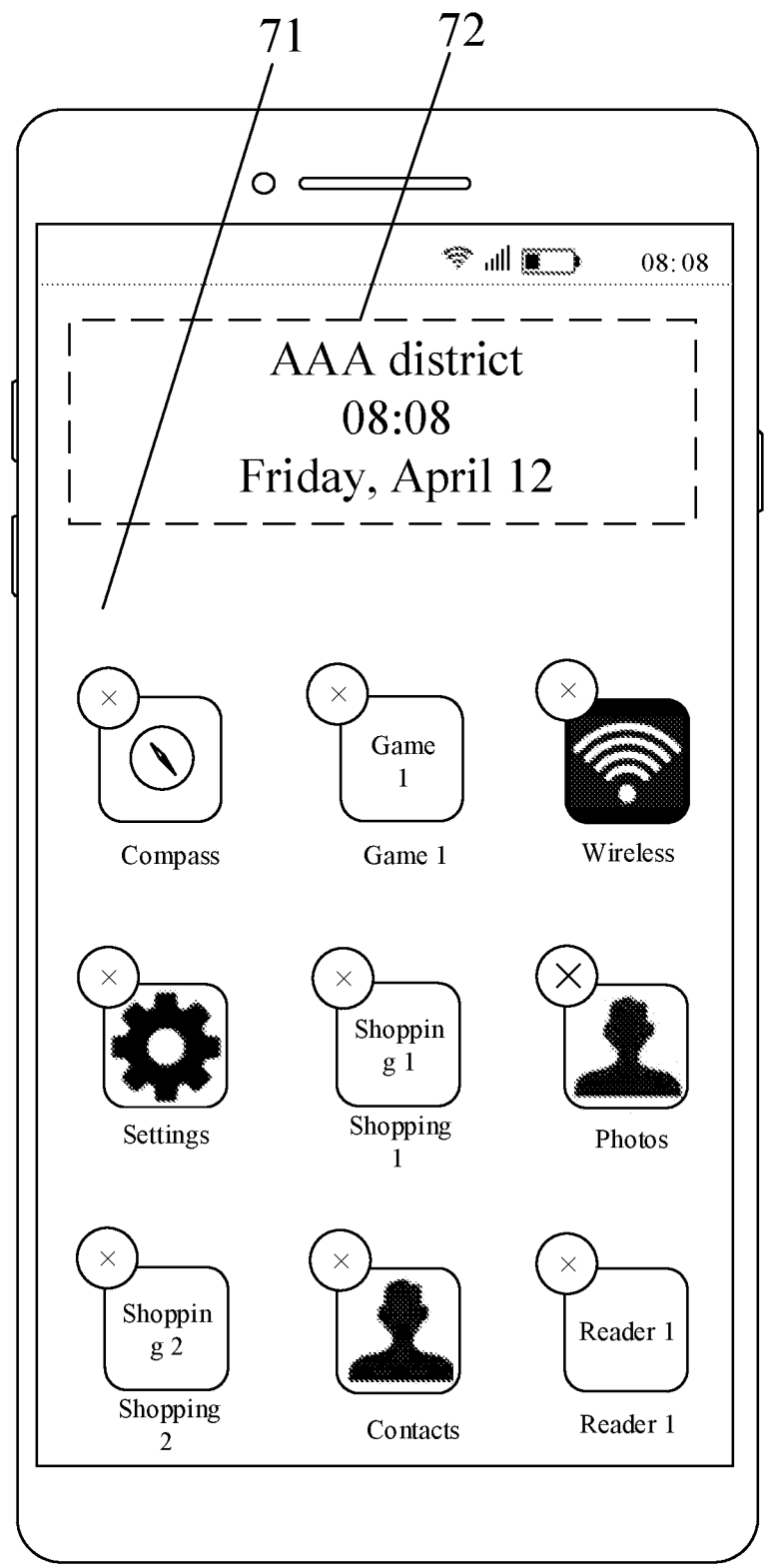
FIG. 7B is a sixth schematic diagram of an application interface of an icon display method according to an embodiment of the present disclosure.
Figure 7C:
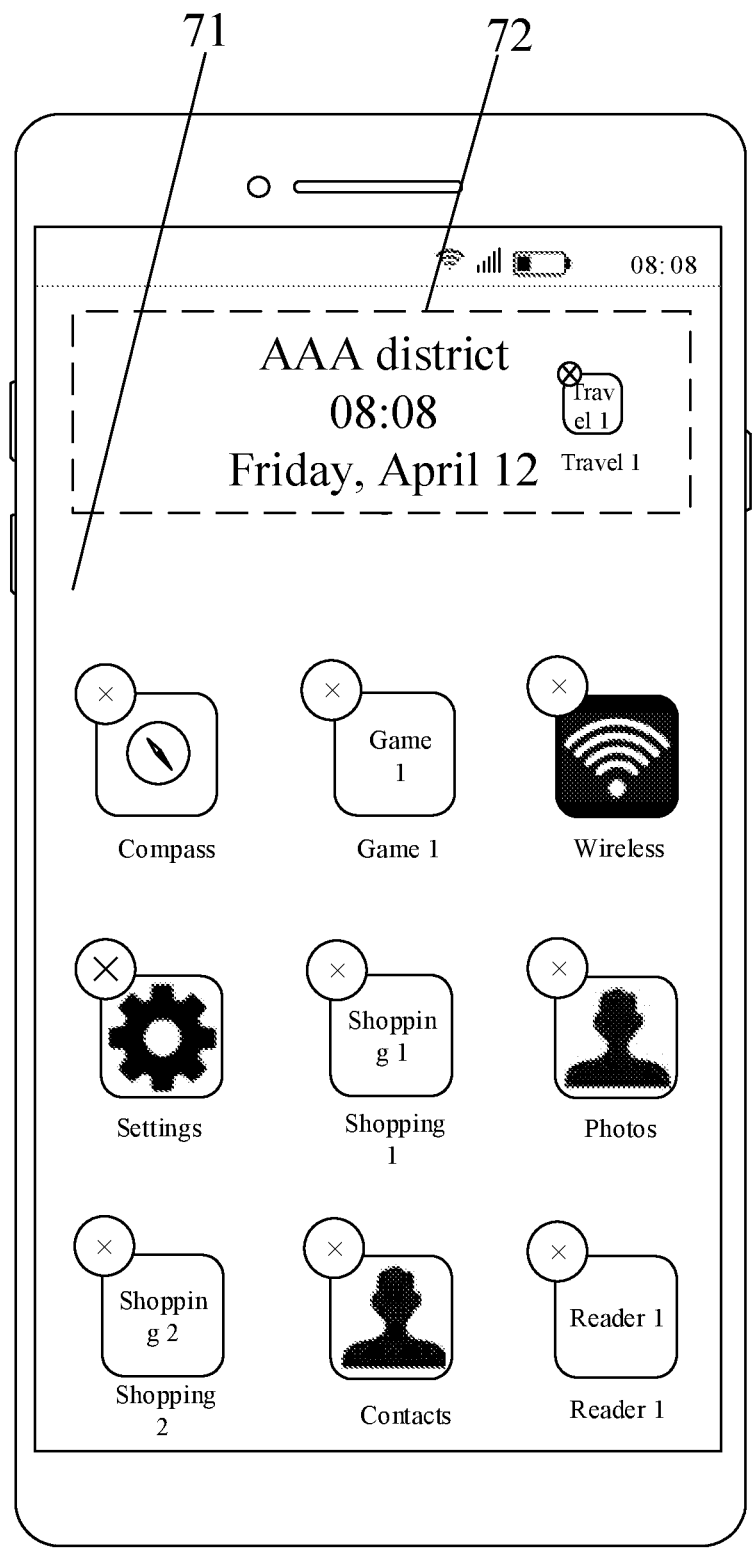
FIG. 7C is a seventh schematic diagram of an application interface of an icon display method according to an embodiment of the present disclosure.

The following further describes the second possible implementation with reference to FIGS. 7A to 7C.

For example, it is assumed that the at least one first interface is an interface of the desktop of the terminal device, the second interface is another interface of the desktop of the terminal device, icons on the second interface are full (that is, a quantity of icons on the second interface reaches the quantity of fixed icon placeholders on the second interface), a widget display area is set in a top area of the second interface, the user needs to move the target icon on the at least one first interface to the second interface, the first input is a drag input performed by the user on the target icon, and the end location of the first input is not in identification ranges of all fixed icon placeholders on the second interface. After the user triggers, through the target input, the desktop of the terminal device to be in an icon editable state, FIG. 7A shows a first interface 70 in an icon editable state, and (FIG. 7B shows a second interface 71 (including a widget display area 72) in an icon editable state. In this case, the user may drag an icon of "Tourism 1" on the first interface 70 shown in FIG. 7A to the second interface 71 shown in FIG. 7B (that is, the first input). When the user drags the icon of "Tourism 1" to a location that is on the second interface 71 and that is not in an identification range of all fixed icon placeholders (for example, the widget display area 72 shown in FIG. 7B), as shown in FIG. 7C, the terminal device may display the icon of "Tourism 1" in the widget display area 72 in response to the first input. It can be understood that a dotted line box in FIG. 7B and FIG. 7C is merely used to represent the widget display area 72. In actual implementation, the dotted line box does not exist.

In this implementation, when icons on the second interface are full, and the user triggers the terminal device to move the target icon on the at least one first interface to the second interface, the terminal device may display the target icon on the first non-fixed icon placeholder on the second interface, (a temporary icon placeholder on the second interface). Therefore, a problem that some icons are squeezed out due to moving of an icon can be avoided, so that flexibility of displaying an icon by the terminal device can be improved, convenience of using the terminal device by the user can be improved, and human-machine interaction performance can be improved.

It can be understood that, in this embodiment of the present disclosure, one of the foregoing first possible implementation and the foregoing second possible implementation may be performed, that is, after S201 is performed, the terminal device may perform S202*a* or S202*b*.

Optionally, in this embodiment of the present disclosure, the target icon may include M second icons, the first non-fixed icon placeholder may include M non-fixed icon placeholders. In this case, if the M second icons are all in the first non-fixed icon placeholder on the second interface, the foregoing S202*b* may be implemented by using the following S202*b*1.

S202*b*1. In response to the first input, the terminal device displays the M second icons in the M non-fixed icon placeholders in a case that the target quantity reaches the target value.

One second icon is displayed in one non-fixed icon placeholder.

Optionally, in this embodiment of the present disclosure, after the user triggers the terminal device to move the M second icons to the second interface, the terminal device may display the M second icons in the M non-fixed placeholders on the second interface. After the terminal device displays the M second icons in the M non-fixed icons on the second interface, the user may first arrange the M second icons in the M non-fixed icon placeholders, and then after the arrangement, replace an icon in a fixed icon placeholder on the second interface through one click, or replace an icon in a fixed icon placeholder on another interface through one click, or send the M second icons to empty fixed icon placeholders on another interface through one click.

Figure 8:
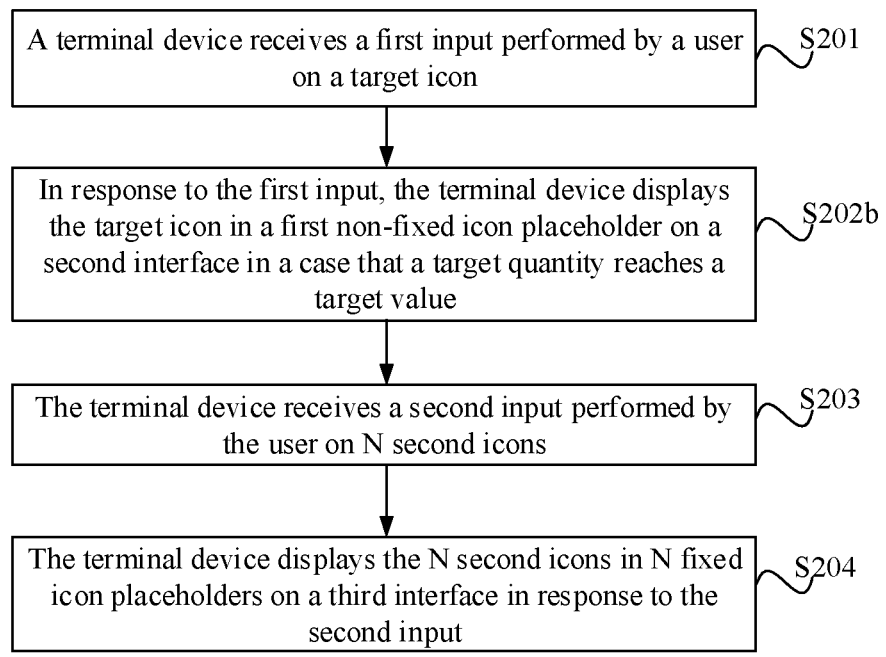
FIG. 8 is a fourth schematic diagram of an icon display method according to an embodiment of the present disclosure.

For example, with reference to FIG. 6, as shown in FIG. 8, after the foregoing S202*b*, the icon display method provided in this embodiment of the present disclosure may further include the following S203 and S204.

S203. The terminal device receives a second input performed by the user on N second icons.

The N second icons are icons in the M second icons. Optionally, the N second icons may be all icons in the M second icons, or may be some icons in the M second icons. Specifically, this may be determined based on an actual use requirement, and is not limited in this embodiment of the present disclosure.

S204. The terminal device displays the N second icons in N fixed icon placeholders on a third interface in response to the second input.

N is a positive integer less than or equal to M.

Optionally, in this embodiment of the present disclosure, the second input may be a drag input performed by the user on the N second icons, or may be an input in any possible form such as a slide input performed by the user on the N second icons. Specifically, this may be determined based on an actual use requirement, and is not limited in this embodiment of the present disclosure.

Optionally, in this embodiment of the present disclosure, the third interface may be the same as the second interface, or may be different from the second interface. That is, the user may trigger the N second icons to replace N icons in fixed icon placeholder on the second interface through one click, or may trigger the N second icons to replace N icons in fixed icon placeholders on another interface through one click, or may trigger the N second icons to be displayed in N empty fixed icon placeholders on another interface.

Optionally, in this embodiment of the present disclosure, an arrangement manner of the N second icons on the second interface may be the same as an arrangement manner of N third icons on the second interface. That is, the arrangement manner of the N second icons on the interface remains unchanged before and after one-click replacement or one-click sending. In this way, in a quick icon operating and arranging process, it can be ensured that an icon arrangement manner on an interface remains unchanged, thereby improving user experience.

The foregoing arrangement manner of the N second icons on the interface is an arrangement order between the N second icons and a two-dimensional space layout of the N second icons on the interface.

Optionally, in this embodiment of the present disclosure, the N second icons may be located in a selection box. The user may perform the second input on the N second icons through an input on the selection box. For example, the user may drag the N second icons by dragging the selection box.

Figure 9A:
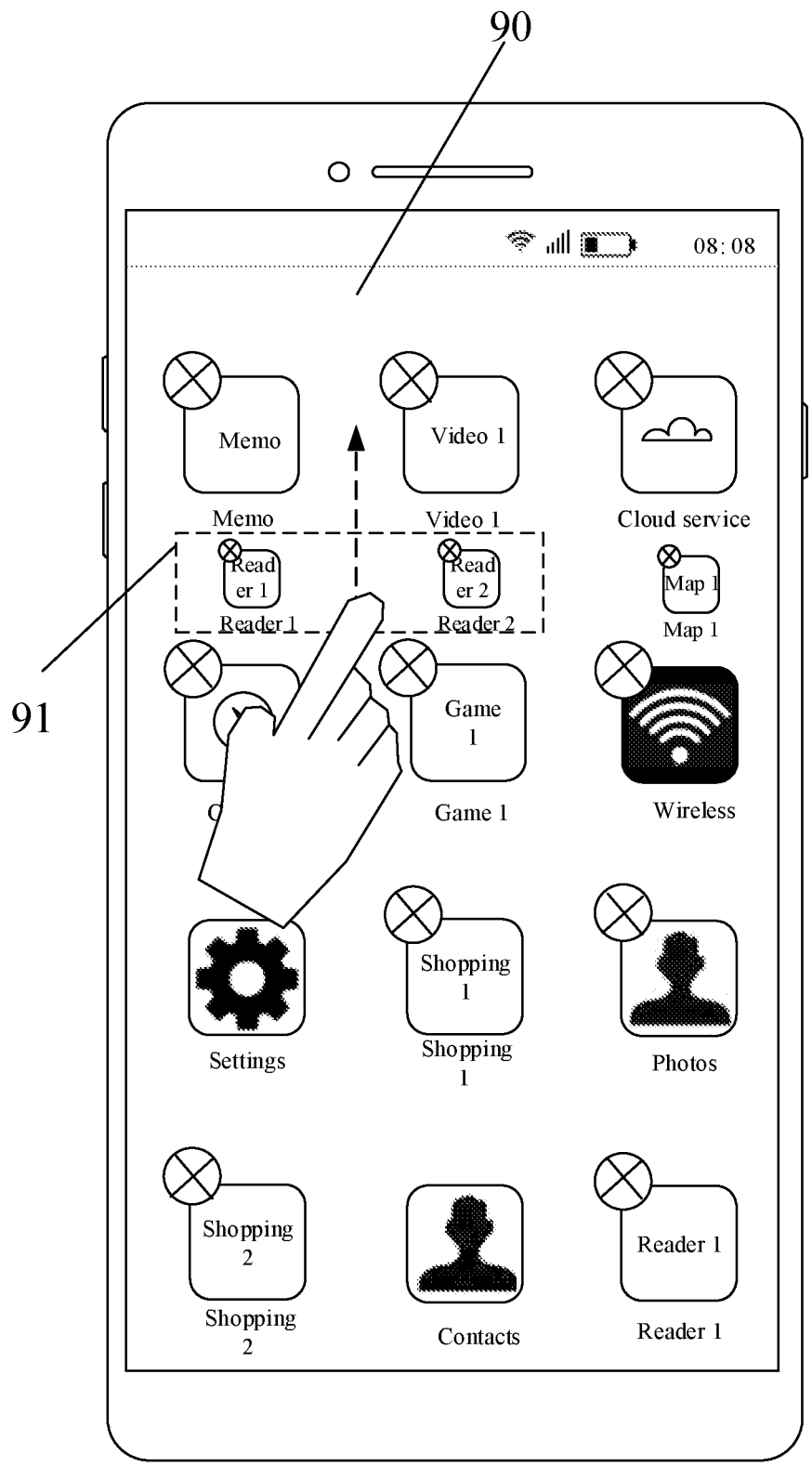
FIG. 9A is an eighth schematic diagram of an application interface of an icon display method according to an embodiment of the present disclosure.
Figure 9B:
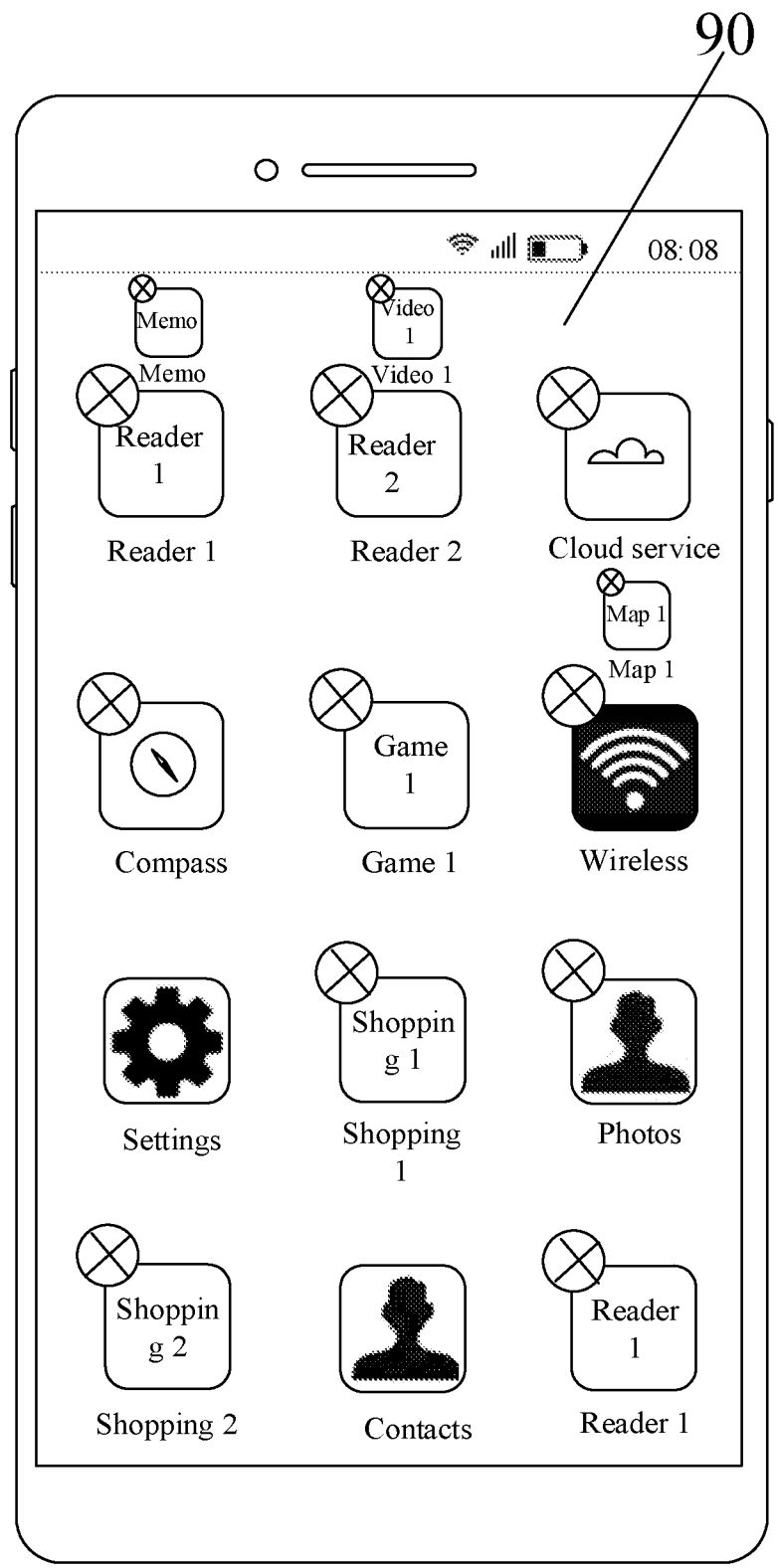
FIG. 9B is a ninth schematic diagram of an application interface of an icon display method according to an embodiment of the present disclosure.

The following further describes the method shown in the foregoing S203 and S204 with reference to FIG. 9A and FIG. 9B.

For example, it is assumed that the third interface is the same as the second interface, three second icons are displayed in non-fixed icon placeholders on the second interface, the user needs to display two of the three second icons in two fixed icon placeholders on the second interface, and the second input is a drag input performed by the user on the selection box. As shown in FIG. 9A, an icon of "Reader 1", an icon of "Reader 2", and an icon of "Map 1" are displayed in non-fixed icon placeholders on a second interface 90, and the user selects the icon of "Reader 1" and the icon of "Reader 2" through a selection box 91. When the user drags the selection box 91 upward to identifications ranges of fixed icon placeholders for displaying an icon of "Memo" and an icon of "Video 1" shown in FIG. 9A (that is, the second input), as shown in FIG. 9B, the terminal device may display, in response to the second input, the icon of "Reader 1" and the icon of "Reader 2" in two fixed icon placeholders for displaying the icon of "Memo" and the icon of "Video 1", and display the icon of "Memo" and the icon of "Video 1" in an area above the two fixed icon placeholders for displaying the icon of "Reader 1" and the icon of "Reader 2" and adjacent to the two fixed icon placeholders. Further, after replacing a display icon, the terminal device may cancel display of the selection box 91.

In this embodiment of the present disclosure, after the user triggers to move M second icons on one or more interfaces to the second interface, the user may trigger, through one operation on the N second icons in the M second icons, the terminal device to replace icons displayed in the N fixed icon placeholders on the second interface through one click, or the terminal device to replace icons displayed in N fixed icon placeholders on another interface (for example, the third interface) through one click, or trigger the terminal device to send the N second icons to empty fixed icon placeholders on another interface through one click. In this way, because the terminal device may replace or send a plurality of icons through one click, icon arranging efficiency can be improved.

Optionally, in this embodiment of the present disclosure, when the N second icons are some icons in the M second icons, before the user performs the second input on the N second icons, the user needs to first select the N second icons from the M second icons.

Figure 10:
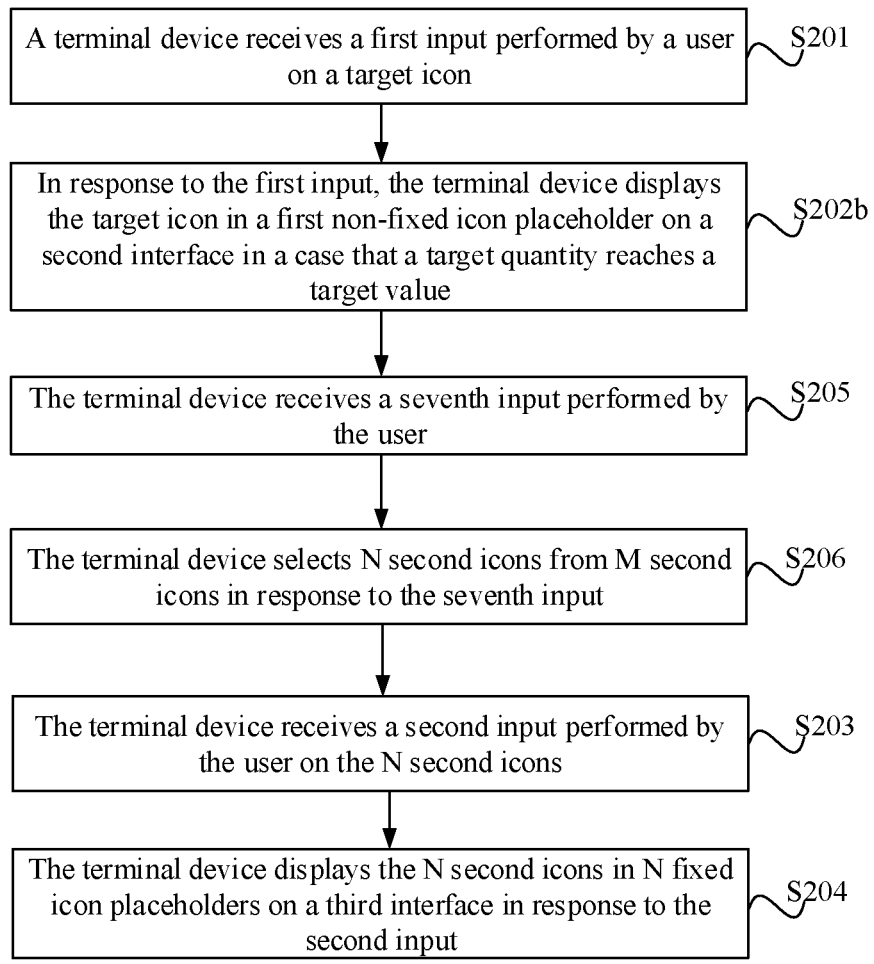
FIG. 10 is a fifth schematic diagram of an icon display method according to an embodiment of the present disclosure.

For example, with reference to FIG. 8, as shown in FIG. 10, after the foregoing S202b and before S203, the icon display method provided in this embodiment of the present disclosure may further include the following S205 and S206.

S205. The terminal device receives a seventh input performed by the user.

The seventh input may be a selection input performed by the user on the N second icons in the M second icons. Optionally, the seventh input may include N first sub-inputs, and each first sub-input is used to select one second icon from the M second icons. That is, the N first sub-inputs may be considered as one input.

Optionally, in this embodiment of the present disclosure, after the user selects the N second icons from the M second icons through the N first sub-inputs, in an implementation, if the terminal device does not detect an input performed by the user within first preset duration, the terminal device may determine that a selection process of the user ends. In another implementation, the user triggers, through an input on some controls (for example, a "determining" control), the terminal device to determine that the selection process of the user ends.

S206. The terminal device selects the N second icons from the M second icons in response to the seventh input.

In this embodiment of the present disclosure, after receiving the N first sub-inputs performed by the user, the terminal device may consider the N first sub-inputs as one input response. That is, in response to the N first sub-inputs, the terminal device may select, from the M second icons, the N second icons selected by the N first sub-inputs.

In this embodiment of the present disclosure, after the user triggers to display the M second icons in non-fixed icon placeholders on the second interface, the user may first trigger the terminal device to adjust an arrangement order of the M second icons, and then move all or a part of the M second icons to proper locations as required, thereby improving flexibility of icon movement and arrangement.

Optionally, in this embodiment of the present disclosure, the target icon may include the M second icons. Before the user triggers to move the M second icons, the user may first trigger to select the M second icons from all interfaces (for example, the at least one first interface) of the desktop of the terminal device. It can be understood that when M is an integer greater than 1, the at least one first interface may be one interface, or may be a plurality of interfaces. Specifically, this may be determined based on an actual use requirement, and is not limited in this embodiment of the present disclosure.

Figure 11:
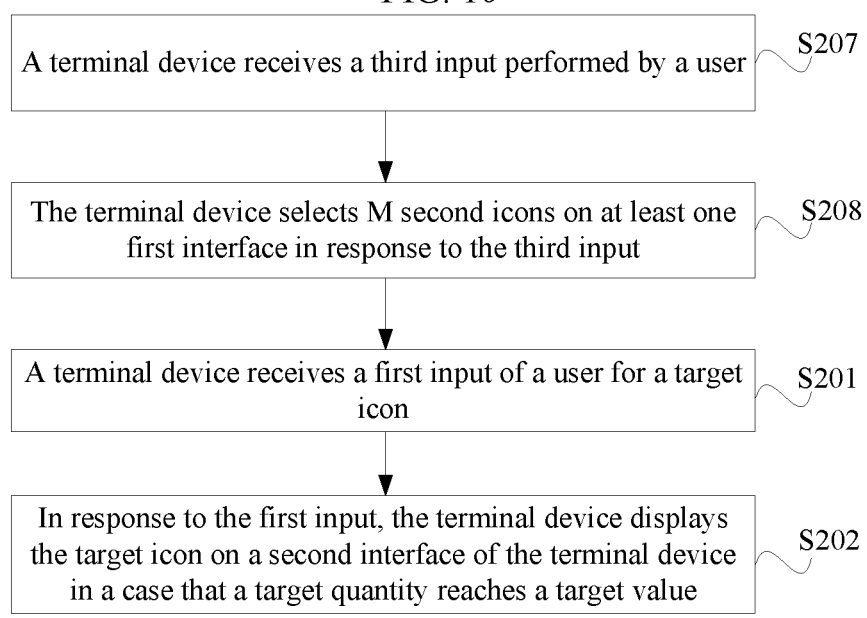
FIG. 11 is a sixth schematic diagram of an icon display method according to an embodiment of the present disclosure.

For example, the at least one first interface is one interface, that is, the M second icons are all icons selected from one interface. With reference to FIG. 2, as shown in FIG. 11, before the foregoing S201, the icon display method provided in this embodiment of the present disclosure may further include the following S207 and S208.

S207. The terminal device receives a third input performed by the user.

In this embodiment of the present disclosure, when the desktop of the terminal device is in an icon editable state, the terminal device may receive the third input performed by the user.

Optionally, in this embodiment of the present disclosure, the third input may be a selection input performed by the user on the target icon, and the target icon is an icon on the at least one first interface. Optionally, the third input may include M second sub-inputs, and each second sub-input is used to select one second icon from the M second icons. That is, the M second sub-inputs may be considered as one input.

Optionally, in this embodiment of the present disclosure, after the user selects the M second icons through the M second sub-inputs, in an implementation, if the terminal device does not detect an input performed by the user within second preset duration, the terminal device may determine that a selection process of the user ends. In another implementation, the user triggers, through an input on some controls (for example, a "determining" control), the terminal device to determine that the selection process of the user ends.

S208. The terminal device selects the M second icons on the at least one first interface in response to the third input.

In this implementation, after the terminal device displays the M second icons on the second interface, the M icons on the second interface are located in non-fixed icon placeholders.

Optionally, in this embodiment of the present disclosure, when the at least one first interface is one first interface, an arrangement manner of the M second icons on the second interface may be the same as an arrangement manner of the M second icons on the first interface.

It should be noted that, in a schematic diagram of the method shown in FIG. 11, target icons in both S201 and S202 are the M second icons, that is, a quantity of target icons is equal to a quantity M of second icons.

In this embodiment of the present disclosure, a plurality of icons may be moved at a time (that is, a plurality of icons on one interface may be moved at a time). Therefore, compared with the related art in which only one icon can be moved at a time, flexibility and efficiency of icon movement can be improved.

Optionally, in this embodiment of the present disclosure, after the terminal device performs the foregoing S202, when P icons are displayed in non-fixed icon placeholders on the second interface, the user may trigger the terminal device to move the P icons to be displayed in fixed icon placeholders on an interface specified by the user (implementation 1), or may trigger the terminal device to randomly move the P icons to fixed icon placeholders on any interface (implementation 2).

The following separately describes the foregoing implementation 1 and implementation 2.

Implementation 1

Figure 12:
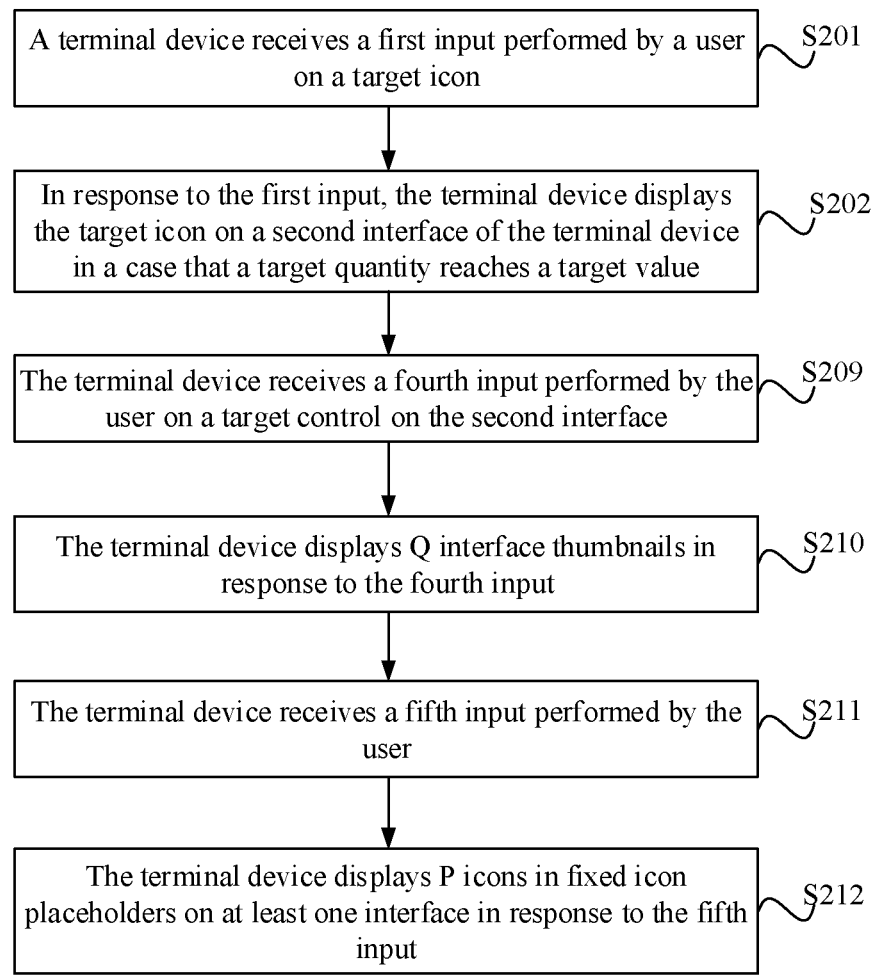
FIG. 12 is a seventh schematic diagram of an icon display method according to an embodiment of the present disclosure.

In implementation 1, for example, with reference to FIG. 2, as shown in FIG. 12, after the foregoing S202, the icon display method provided in this embodiment of the present disclosure may further include the following S209 to S212.

S209. The terminal device receives a fourth input performed by the user on a target control on the second interface.

Optionally, in this embodiment of the present disclosure, the fourth input may be an input in any possible form such as a click input performed by the user on the target control, a touch and hold input performed by the user on the target control, a re-press input performed by the user on the target control, or a slide input performed by the user on the target control. Specifically, this may be determined based on an actual use requirement, and is not limited in this embodiment of the present disclosure. It can be understood that in this embodiment of the present disclosure, the user may trigger, through the target input, the terminal device to display the target control on each interface of the desktop.

S210. The terminal device displays Q interface thumbnails in response to the fourth input.

Each of the Q interface thumbnails may be used to indicate one interface of the desktop of the terminal device, and Q is a positive integer.

Optionally, in this embodiment of the present disclosure, interfaces indicated by the Q interface thumbnails may be all interfaces of the desktop of the terminal device, or may be interfaces of the desktop of the terminal device except the second interface. Specifically, this may be determined based on an actual use requirement, and is not limited in this embodiment of the present disclosure.

Optionally, in this embodiment of the present disclosure, the terminal device may display the Q interface thumbnails below an interface thumbnail of the second interface.

S211. The terminal device receives a fifth input performed by the user.

The fifth input may be used to select at least one interface thumbnail from the Q interface thumbnails.

Optionally, the fifth input may be an input in any possible form such as a click input performed by the user on the at least one of the Q interface thumbnails (which may be implemented by through a click input on each interface thumbnail, that is, the fifth input may include a plurality of inputs in this case), or a slide input performed by the user on the at least one of the Q interface thumbnails. Specifically, this may be determined based on an actual use requirement, and is not limited in this embodiment of the present disclosure.

S212. The terminal device displays the P icons in fixed icon placeholders on at least one interface in response to the fifth input.

The at least one interface is an interface indicated by the at least one interface thumbnail.

In this embodiment of the present disclosure, when the P icons on the second interface are in non-fixed icon placeholders, the user may trigger, through the fifth input, the terminal device to move the P icons in the non-fixed icon placeholders on the second interface to fixed icon placeholders on the at least one interface indicated by the at least one interface thumbnail (that is, the at least one interface thumbnail in the Q interface thumbnails) whose display is triggered by the user through the fourth input. Therefore, all icons on the interfaces of the desktop of the terminal device are in fixed icon placeholders, thereby facilitating the user's operation.

Optionally, in this embodiment of the present disclosure, the terminal device may sequentially move, based on an order of selecting interface thumbnails by the user, the p icons on the second interface to empty fixed icon placeholders on an interface indicated by each interface thumbnail that is selected by the user, until all the P icons are moved out of the second interface. Optionally, the terminal device may sequentially move the P icon on the second interface from the bottom to the top and from the right to the left. Further, after the terminal device removes the P icons on the second interface (icons in non-fixed icon placeholders on the second interface), the terminal may automatically trigger the desktop of the terminal device to exit an icon editable state, and the terminal device may display the second interface.

Figure 13A:
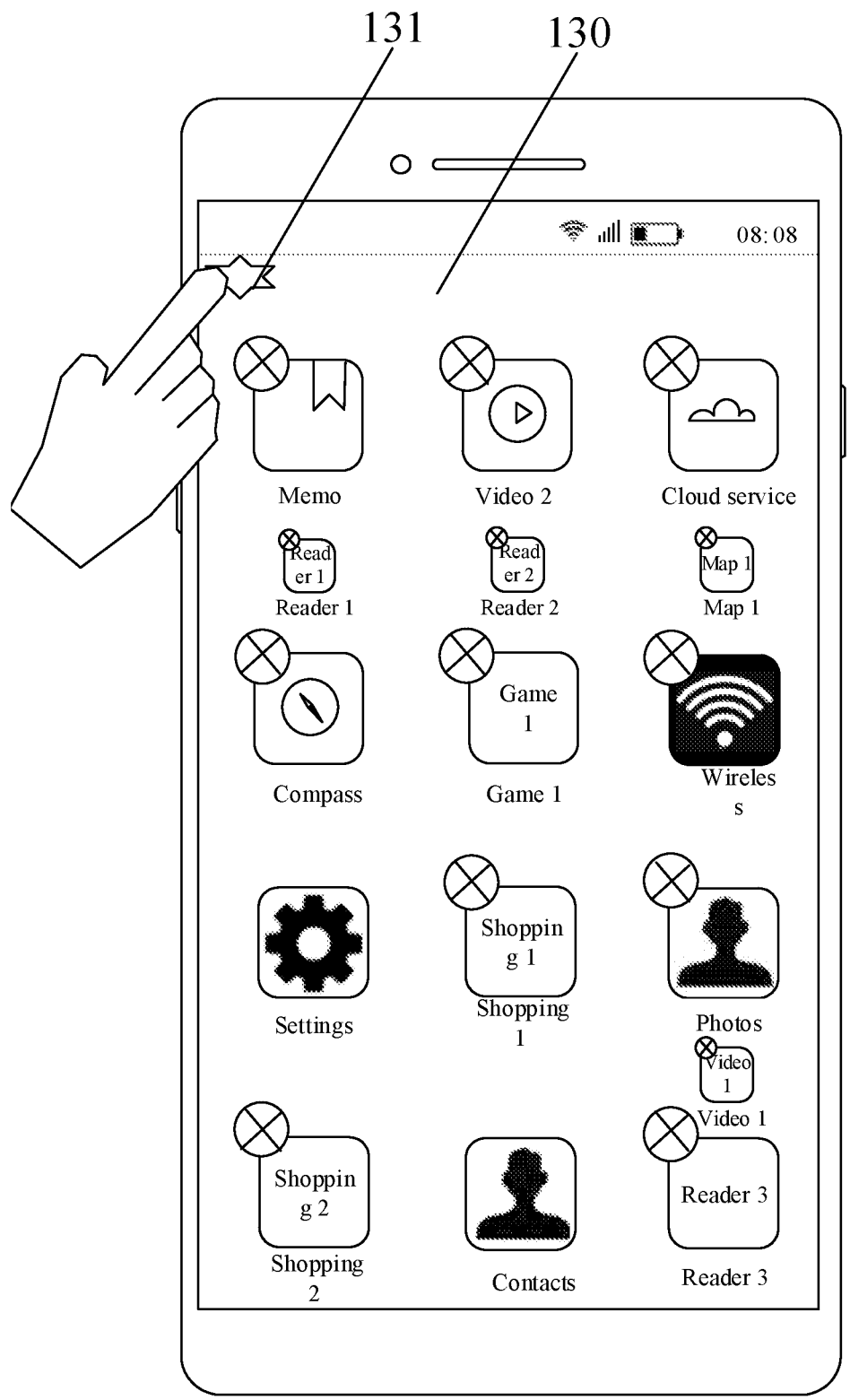
FIG. 13A is a tenth schematic diagram of an application interface of an icon display method according to an embodiment of the present disclosure.
Figure 13B:
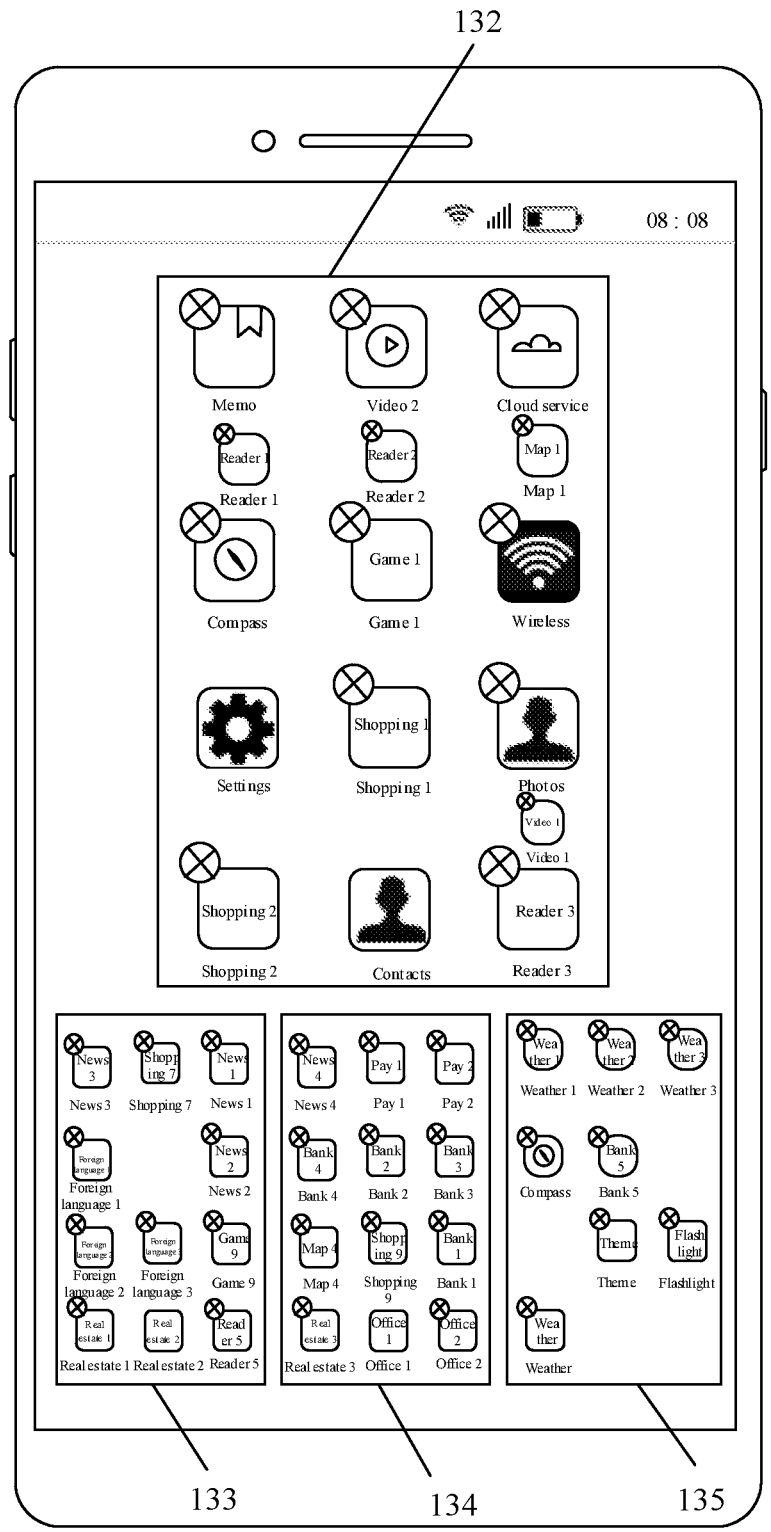
FIG. 13B is a eleventh schematic diagram of an application interface of an icon display method according to an embodiment of the present disclosure.
Figure 13C:
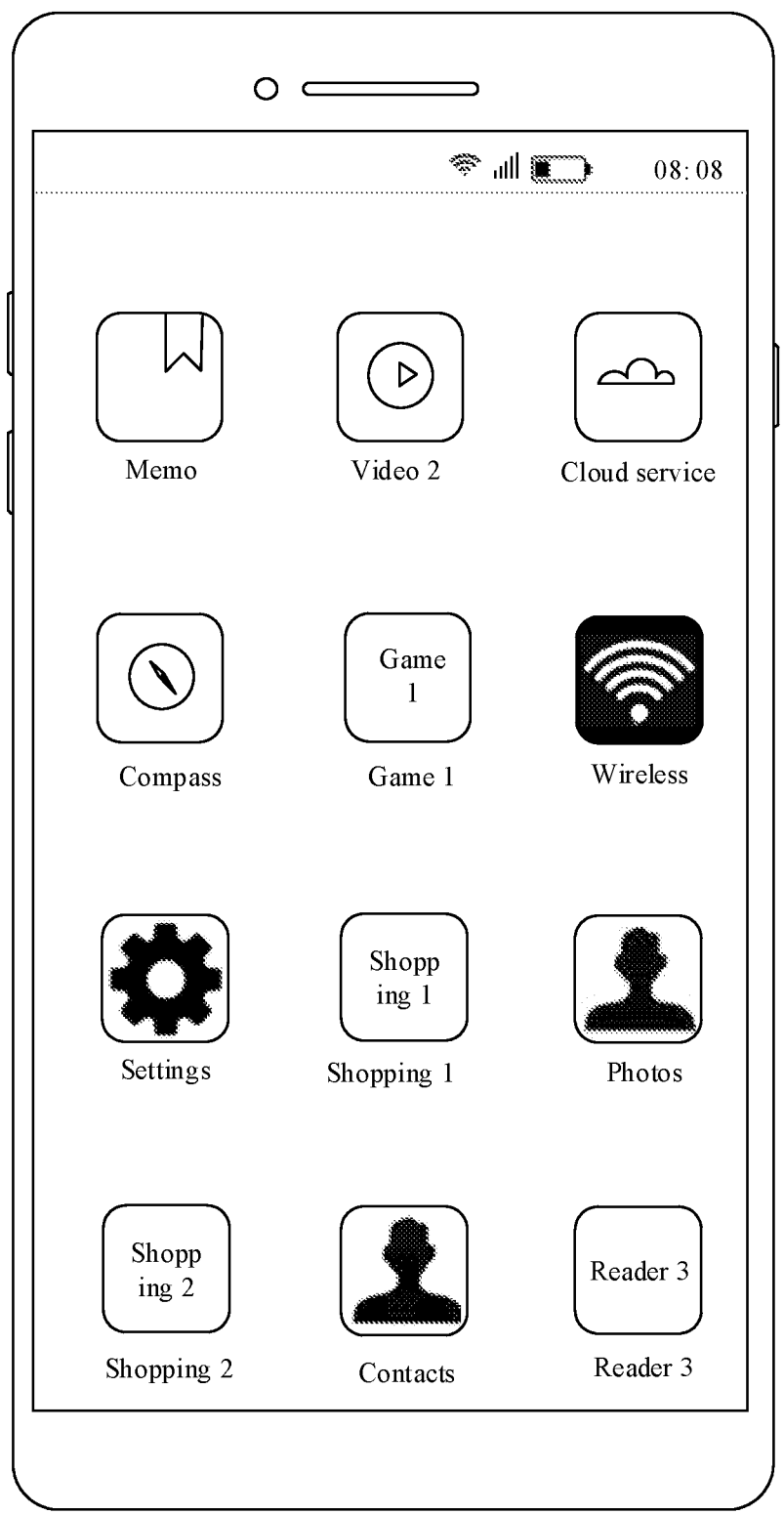
FIG. 13C is a twelfth schematic diagram of an application interface of an icon display method according to an embodiment of the present disclosure.

The following further describes the method shown in the foregoing S209 to S212 with reference to FIGS. 13A to 13C.

For example, it is assumed that four icons on the second interface are located in non-fixed icon placeholders (that is, P=4), and the four icons are successively an icon of "Video 1", an icon of "Map 1", an icon of "Reader 2", and an icon of "Reader 1" from the bottom to the top and from the right to the left. In addition, it is assumed that the terminal device displays three interface thumbnails (that is, Q=3) below the interface thumbnail of the second interface: a first interface thumbnail, a second interface thumbnail, and a third interface thumbnail, and there is one empty fixed icon placeholder in the first interface thumbnail, no empty fixed icon placeholder in the second interface thumbnail, and four empty fixed icon placeholders in the third interface thumbnail. It is assumed that the fifth input is a click input performed by the user on the first interface thumbnail and the third interface thumbnail. As shown in FIG. 13A, the user clicks a target control 131 on a second interface 130 (in this case, the second interface is in an icon editable state), that is, the terminal device receives the fourth input performed by the user. As shown in FIG. 13B, the terminal device may separately display a first interface thumbnail 133, a second interface thumbnail 134, and a third interface thumbnail 135 below an interface thumbnail 132 of the second interface 130 in response to the fourth input. The user sequentially clicks the first interface thumbnail 133 and the third interface thumbnail 135, that is, the terminal device receives the fifth input performed by the user, and in response to the fifth input, the terminal device moves the icon of "Video 1" to an empty fixed icon placeholder on an interface indicated by the first interface thumbnail, and sequentially moves the icon of "Map 1", the icon of "Reader 2", and the icon of "Reader 1" to empty fixed icon placeholders on an interface indicated by the third interface thumbnail. Optionally, as shown in FIG. 13C, the terminal device may automatically trigger that the desktop of the terminal device to exit an icon editable state, and the terminal device may display the second interface.

Implementation 2

Figure 14:
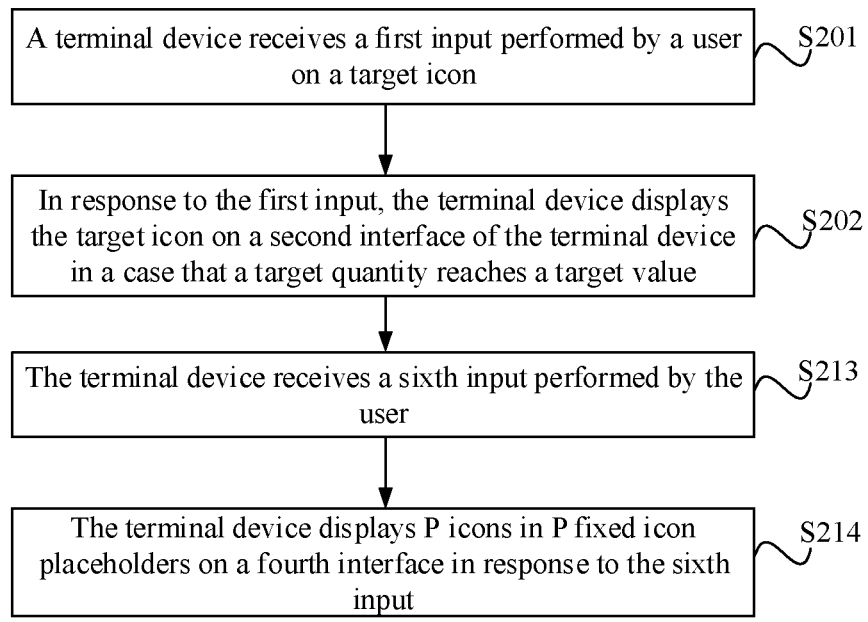
FIG. 14 is an eighth schematic diagram of an icon display method according to an embodiment of the present disclosure.

In implementation 2, for example, with reference to FIG. 2, as shown in FIG. 14, after the foregoing S202, the icon display method provided in this embodiment of the present disclosure may further include the following S213 and S214.

S213. The terminal device receives a sixth input performed by the user.

S214. The terminal device displays the P icons in P fixed icon placeholders on a fourth interface in response to the sixth input.

The P fixed icon placeholders are fixed icon placeholders of icons that are not displayed on the fourth interface before the P icons are displayed on the fourth interface.

Optionally, in this embodiment of the present disclosure, the sixth input may be an input performed by the user to rock or shake the terminal device.

Optionally, the sixth input may be an input performed by the user to rock or shake the terminal device in a preset manner. The preset manner may be rocking or shaking in a specified straight line direction, shaking or shaking in a clockwise direction, or shaking or shaking in a counterclockwise direction. Specifically, this may be determined based on an actual use requirement, and is not limited in the embodiments of the present disclosure.

It can be understood that, in this embodiment of the present disclosure, the technical solutions in the foregoing implementation 1 and implementation 2 may be performed when any interface includes an icon in a non-fixed icon placeholder. The foregoing implementation 1 and implementation 2 are described by using an example in which the second interface includes the P icons in the non-fixed icon placeholders. In actual implementation, the foregoing implementation 1 and implementation 2 may be executed when any interface includes an icon in a non-fixed icon placeholder. This is not limited in this embodiment of the present disclosure.

In this embodiment of the present disclosure, in the foregoing implementation 1 and implementation 2, in a case that icons on the second interface are full, after the user triggers the terminal device to move the target icon to the second interface, the user may adjust and arrange an the icon layout of the second interface, and after the adjustment and arrangement, the user may trigger the terminal device to move an icon in a non-fixed icon placeholder on the second interface to a fixed icon placeholder on another interface, so that arrangement of icons in the desktop of the terminal device can be completed, thereby facilitating the user's operation.

It can be understood that in the foregoing embodiment, a scenario in which icons displayed on an interface of the desktop of the terminal device are full, and the user needs to move an icon displayed on another interface of the desktop of the terminal device to the interface is used as an example to describe the icon display method provided in this embodiment of the present disclosure. In specific implementation, the icon display method provided in this embodiment of the present disclosure may be further applied to a scenario in which icons on all interfaces of the desktop of the terminal device are full when an application program is newly downloaded. Optionally, when an application program is newly downloaded, if icons on all interfaces of the desktop of the terminal device are full, after the application program is downloaded, an icon of the application program may be displayed in a non-fixed icon placeholder (a temporary icon placeholder) on any interface. In this way, in a scenario of downloading the application program, the icon of the newly downloaded application program is displayed in a non-fixed icon placeholder, so that the new application program can still be downloaded when the icons on the interfaces are full. Therefore, flexibility of displaying an icon by the terminal device can be improved, convenience of using the terminal device by the user can be improved, and human-machine interaction performance can be improved.

It should be noted that, in this embodiment of the present disclosure, the icon display method shown in the foregoing method accompanying drawings are described by using an example with reference to one of the accompanying drawings in this embodiment of the present disclosure. In specific implementation, the icon display method shown in the foregoing method accompanying drawings may be further implemented with reference to any other accompanying drawings that may be combined shown in the foregoing embodiments. Details are not described herein again.

It can be understood that, in this embodiment of the present disclosure, a fixed icon placeholder and a non-fixed icon placeholder in each interface schematic diagram of the icon display method shown in the foregoing method accompanying drawings are merely intended to indicate an azimuth relationship between the fixed icon placeholder and the non-fixed icon placeholder, and cannot be understood as a limitation on a distance between the fixed icon placeholder and the non-fixed icon placeholder, or a limitation on an identification range of the fixed icon placeholder. The distance between the fixed icon placeholder and the non-fixed icon placeholder and the identification range of the fixed icon placeholder should be determined based on an actual use requirement, and are not limited in this embodiment of the present disclosure.

Figure 15:
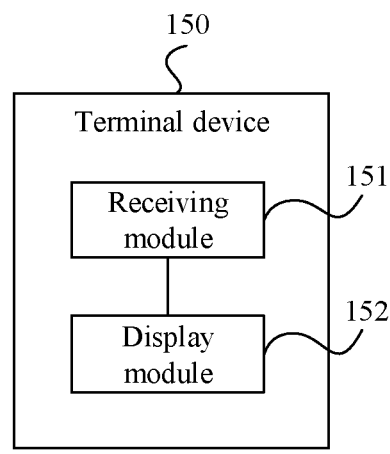
FIG. 15 is a schematic structural diagram of a terminal device according to an embodiment of the present disclosure.

As shown in FIG. 15, an embodiment of the present disclosure provides a terminal device 150. The terminal device may include a receiving module 151 and a display module 152. The receiving module 151 may be configured to receive a first input performed by a user on a target icon, where the target icon may be an icon on at least one first interface; and the display module 152 may be configured to: in response to the first input received by the receiving module 151, display the target icon on a second interface in a case that a target quantity reaches a target value, where the target quantity is a quantity of icons displayed in fixed icon placeholders on the second interface, and the target value is a quantity of fixed icon placeholders on the second interface; and after the terminal device displays the target icon on the second interface, P icons on the second interface are located in non-fixed icon placeholders, P is a quantity of target icons, and P is a positive integer.

Optionally, in this embodiment of the present disclosure, the display module 152 may be configured to: display the target icon in a first fixed icon placeholder on the second interface, and display a first icon in a first non-fixed icon placeholder, where the first icon may be an icon displayed in the first fixed icon placeholder before the display module 152 displays the target icon in the first fixed icon placeholder. Alternatively, the display module 152 may be configured to display the target icon in a first non-fixed icon placeholder on the second interface.

Optionally, in this embodiment of the present disclosure, the target icon may include M second icons, the first non-fixed icon placeholder may include M non-fixed icon placeholders, and M is a positive integer. The display module may be configured to display the M second icons in the M non-fixed icon placeholders; the receiving module 151 may be further configured to receive a second input performed by the user on N second icons; and the display module 152 may be further configured to display the N second icons in N fixed icon placeholders on a third interface in response to the second input received by the receiving module 151. The N second icons are icons in the M second icons, and N is a positive integer less than or equal to M.

Optionally, in this embodiment of the present disclosure, an arrangement manner of the N second icons on the third interface may be the same as an arrangement manner of the N second icons on the second interface.

Optionally, in this embodiment of the present disclosure, the target icon may include M second icons, and M is an integer greater than 1. The receiving module 151 may be further configured to: before receiving the first input performed by the user on the target icon, receive a third input performed by the user; and the display module 152 may be further configured to select the M second icons on the at least one first interface in response to the third input received by the receiving module 151. After the display module 152 displays the M second icons on the second interface, the M icons on the second interface are located in non-fixed icon placeholders.

Optionally, in this embodiment of the present disclosure, the at least one first interface is one first interface, and an arrangement manner of the M second icons on the second interface may be the same as an arrangement manner of the M second icons on the at least one first interface.

Optionally, in this embodiment of the present disclosure, the receiving module 151 may be further configured to: after the display module 152 displays the target icon on the second interface, receive a fourth input performed by the user on a target control on the second interface; the display module 152 may be further configured to display Q interface thumbnails in response to the fourth input received by the receiving module 151; the receiving module 151 may be further configured to receive a fifth input performed by the user, where the fifth input is used to select at least one interface thumbnail from the Q interface thumbnails; and the display module 152 may be further configured to display the P icons in fixed icon placeholders on at least one interface in response to the fifth input received by the receiving module 151. Each interface thumbnail in the Q interface thumbnails is used to indicate one interface in the terminal device, the at least one interface may be an interface indicated by the at least one interface thumbnail, and Q is a positive integer.

Optionally, in this embodiment of the present disclosure, the receiving module 151 may be further configured to: after the display module 152 displays the target icon on the second interface, receive a sixth input performed by the user; and the display module 152 may be further configured to display the P icons in P fixed icon placeholders on a fourth interface in response to the sixth input received by the receiving module 151, where the P fixed icon placeholders may be fixed icon placeholders of icons that are not displayed before the display module 152 displays the P icons on the fourth interface.

The terminal device 150 provided in this embodiment of the present disclosure can implement the processes implemented by the terminal device shown in the foregoing method embodiment. To avoid repetition, details are not described herein again.

An embodiment of the present disclosure provides a terminal device. The terminal device may receive a first input performed by a user on a target icon (an icon on at least one interface); and display the target icon on a second interface in response to the first input, in a case that a target quantity (a quantity of icons displayed in fixed icon placeholders on the second interface) reaches a target value (a quantity of fixed icon placeholders on the second interface), where after the target icon is displayed on the second interface, P icons on the second interface are located in non-fixed icon placeholders, P is a quantity of target icons, and P is a positive integer. In this solution, when icons on an interface in the terminal device are full (a quantity of icons displayed in fixed icon placeholders on the interface reaches a quantity of fixed icon placeholders on the interface), in the embodiments of the present disclosure, an icon may be further displayed in a temporary icon placeholder (a non-fixed icon placeholder) on the interface, so that the interface can display a larger quantity of icons than the quantity of fixed icon placeholders on the interface. Therefore, a problem that some icons are squeezed out due to moving of an icon can be avoided, so that flexibility of displaying an icon by the terminal device can be improved, convenience of using the terminal device by the user can be improved, and human-machine interaction performance can be improved.

Figure 16:
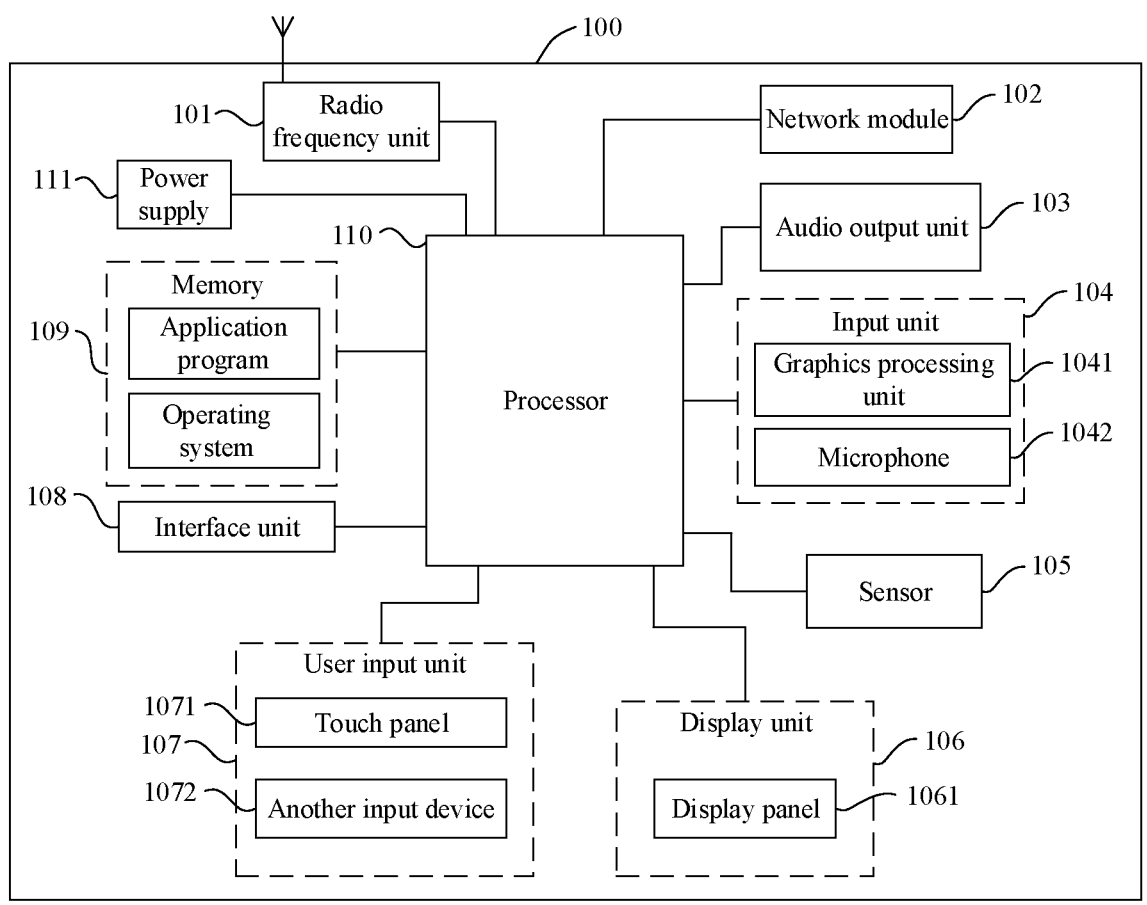
FIG. 16 is a schematic diagram of hardware of a terminal device according to an embodiment of the present disclosure.

FIG. 16 is a schematic diagram of a hardware structure of a terminal device according to embodiments of the present disclosure. As shown in FIG. 16, a terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the terminal device shown in FIG. 16 does not constitute a limitation to the terminal device. The terminal device may include more or fewer components than that shown in the figure, or a combination of some components, or an arrangement of different components. In this embodiment of the present disclosure, the terminal device includes, but is not limited to, a mobile phone, a tablet computer, a notebook computer, a palmtop computer, a vehicle-mounted terminal, a wearable device, a pedometer, or the like.

The processor 110 is configured to control the user input unit 107 to receive a first input performed by a user on a target icon, where the target icon is an icon on at least one first interface; and in response to the first input, control the display unit 106 to display the target icon on a second interface in a case that a target quantity reaches a target value, where the target quantity is a quantity of icons displayed in fixed icon placeholders on the second interface, and the target value is a quantity of fixed icon placeholders on the second interface; and after the terminal device displays the target icon on the second interface, P icons on the second interface are located in non-fixed icon placeholders, P is a quantity of target icons, and P is a positive integer.

An embodiment of the present disclosure provides a terminal device. The terminal device may receive a first input performed by a user on a target icon (an icon on at least one first interface); and display the target icon on a second interface in response to the first input, in a case that a target quantity (a quantity of icons displayed in fixed icon placeholders on the second interface) reaches a target value (a quantity of fixed icon placeholders on the second interface), where after the target icon is displayed on the second interface, P icons on the second interface are located in non-fixed icon placeholders, P is a quantity of target icons, and P is a positive integer. In this solution, when icons on an interface in the terminal device are full (a quantity of icons displayed in fixed icon placeholders on the interface reaches a quantity of fixed icon placeholders on the interface), in the embodiments of the present disclosure, an icon may be further displayed in a temporary icon placeholder (a non-fixed icon placeholder) on the interface, so that the interface can display a larger quantity of icons than the quantity of fixed icon placeholders on the interface. Therefore, a problem that some icons are squeezed out due to moving of an icon can be avoided, so that flexibility of displaying an icon by the terminal device can be improved, convenience of using the terminal device by the user can be improved, and human-machine interaction performance can be improved.

It should be understood that, in this embodiment of the present disclosure, the radio frequency unit 101 may be configured to receive and send information or a signal in a call process. For example, after receiving downlink data from a base station, the radio frequency unit 101 sends the downlink data to the processor 110 for processing. In addition, the radio frequency unit 101 sends uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may also communicate with another device through a wireless communications system and network.

The terminal device provides wireless broadband Internet access for the user by using the network module 102, for example, helping the user to send and receive an e-mail, brows a web page, and access streaming media.

The audio output unit 103 can convert audio data received by the radio frequency unit 101 or the network module 102 or stored in the memory 109 into an audio signal, and output the audio signal as sound. In addition, the audio output unit 103 may further provide an audio output (for example, a call signal received voice, or a message received voice) related to a specific function implemented by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The graphics processing unit 1041 processes image data of a still picture or a video obtained by an image capture apparatus (for example, a camera) in a video capture mode or an image capture mode. The processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and may process such sound into audio data. Processed audio data may be converted, in a call mode, into a format that can be sent to a mobile communication base station by using the radio frequency unit 101 for output.

The terminal device 100 further includes at least one sensor 105, such as an optical sensor, a motion sensor, and another sensor. The light sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information inputted by a user or information provided to a user. The display unit 106 may include the display panel 1061, and the display panel 1061 may be configured in a form of a liquid crystal display (LCD), an organic light-emitting diode (OLED), or the like.

The user input unit 107 may be configured to receive inputted digit or character information, and generate key signal input related to user setting and function control of the terminal device. The user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection device detects a touch position of the user, detects a signal brought by the touch operation, and sends the signal to the touch controller. The touch controller receives touch information from the touch detection device, converts the touch information into touch point coordinates, sends the touch point coordinates to the processor 110, and receives and executes a command sent by the processor 110. In addition, the touch panel 1071 may be of a resistive type, a capacitive type, an infrared type, a surface acoustic wave type, or the like. The user input unit 107 may include the another input device 1072 in addition to the touch panel 1071. The another input device 1072 may include, but is not limited to, a physical keyboard, a function key (such as a volume control key or an on/off key), a trackball, a mouse, and a joystick. Details are not described herein again.

Optionally, the touch panel 1071 may cover the display panel 1061. When detecting the touch operation on or near the touch panel 1071, the touch panel 1071 transmits the touch operation to the processor 110 to determine a type of a touch event, and then the processor 110 provides corresponding visual output on the display panel 1061 based on the type of the touch event. In FIG. 16, although the touch panel 1071 and the display panel 1061 are used as two independent parts to implement input and output functions of the terminal device, in some embodiments, the touch panel 1071 and the display panel 1061 may be integrated to implement the input and output functions of the terminal device. This is not specifically limited herein.

The interface unit 108 is an interface for connecting an external apparatus with the terminal device 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 109 may include a high-speed random access memory, and may further include a non-volatile memory such as at least one magnetic disk storage component, a flash memory component, or another volatile solid-state storage component.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, an application processor and a modem processor may be integrated into the processor 110. The application processor mainly processes an operating system, a user interface, an application program, and the like. The modem processor mainly processes wireless communications. It can be understood that, alternatively, the modem processor may not be integrated into the processor 110.

The terminal device 100 may further include the power supply 111 (such as a battery) that supplies power to each component. Optionally, the power supply may be logically connected to the processor 110 by using a power supply management system, so as to implement functions such as charging and discharging management, and power consumption management by using the power supply management system.

In addition, the terminal device 100 includes some function modules not shown, and details are not described herein.

Optionally, an embodiment of the present disclosure further provides a terminal device, and the terminal device may include the processor 110 and the memory 109 shown in FIG. 16, and a computer program that is stored in the memory 109 and executable on the processor 110. When the computer program is executed by the processor 110, the processes of the foregoing method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the processes of the foregoing method embodiment are implemented and a same technical effect can be achieved. To avoid repetition, details are not described herein again. The non-transitory computer-readable storage medium may include a read-only memory (ROM), a random access memory (RAM), a magnetic disk, an optical disc, or the like.

It should be noted that in this specification, the term "include", "comprise", or any other variant thereof is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. An icon display method, applied to a terminal device, wherein the method comprises:

receiving a first input performed by a user on a target icon, wherein the target icon is an icon on at least one first interface; and in response to the first input, displaying the target icon on a second interface in a case that a target quantity reaches a target value, wherein the target quantity is a quantity of icons displayed in fixed icon placeholders on the second interface, and the target value is a quantity of fixed icon placeholders on the second interface, wherein after the target icon is displayed on the second interface, P icons on the second interface are located in non-fixed icon placeholders, P is a quantity of target icons, and P is a positive integer greater than 1; wherein the fixed icon placeholders are display areas for displaying icons in the second interface; the non-fixed icon placeholders are other display areas for displaying icons in the second interface other than the fixed icon placeholders, and in a case that the icons in the second interface are in an editable state, the non-fixed icon placeholders are used for displaying icons;

in a case that an end location of the first input is in an identification range of a first fixed icon placeholder on the second interface, displaying the target icon in the first fixed icon placeholder on the second interface, and displaying a first icon in a first non-fixed icon placeholder, wherein the first icon is an icon displayed in the first fixed icon placeholder before the target icon is displayed in the first fixed icon placeholder; or in a case that an end location of the first input is not in identification ranges of all fixed icon placeholders on the second interface, displaying the target icon in the first non-fixed icon placeholder on the second interface; wherein the displaying the target icon on a second interface comprises:

displaying the target icon in the first non-fixed icon placeholder on the second interface; wherein the target icon comprises M second icons, the first non-fixed icon placeholder comprises M non-fixed icon placeholders, and M is a positive integer greater than 1; and the displaying the target icon in the first non-fixed icon placeholder on the second interface comprises:

displaying the M second icons in the M non-fixed icon placeholders; and the method further comprises:

arranging the M second icons in the M non-fixed icon placeholders;

receiving a second input performed by the user on N second icons, wherein the N second icons are icons in the M second icons, N is a positive integer greater than 1, and N is a positive integer less than or equal to M; and displaying the N second icons in N fixed icon placeholders on a third interface in response to the second input; wherein an arrangement manner of the N second icons on the third interface is the same as an arrangement manner of the N second icons on the second interface; wherein an arrangement manner of the N second icons on an interface is an arrangement order between the N second icons and a two-dimensional space layout of the N second icons on the interface.

2. The method according to claim 1, wherein the target icon comprises M second icons, and M is an integer greater than 1; and before the receiving the first input performed by a user on a target icon, the method further comprises:
receiving a third input performed by the user; and
selecting the M second icons on the at least one first interface in response to the third input, wherein
after the M second icons are displayed on the second interface, M icons on the second interface are located in non-fixed icon placeholders.

3. The method according to claim 2, wherein the at least one first interface is one first interface, and an arrangement manner of the M second icons on the second interface is the same as an arrangement manner of the M second icons on the at least one first interface.

4. The method according to claim 1, wherein after the displaying the target icon on the second interface, the method further comprises:
receiving a fourth input performed by the user on a target control on the second interface;
displaying Q interface thumbnails in response to the fourth input, wherein each interface thumbnail is used to indicate one interface, and Q is a positive integer;
receiving a fifth input performed by the user, wherein the fifth input is used to select at least one interface thumbnail from the Q interface thumbnails; and
displaying the P icons in fixed icon placeholders on at least one interface in response to the fifth input, wherein the at least one interface is an interface indicated by the at least one interface thumbnail.

5. The method according to claim 1, wherein after the displaying the target icon on the second interface, the method further comprises:
receiving a sixth input performed by the user; and
displaying the P icons in P fixed icon placeholders on a fourth interface in response to the sixth input, wherein the P fixed icon placeholders are fixed icon placeholders of icons that are not displayed before the P icons are displayed on the fourth interface.

6. A terminal device, comprising a processor, a memory, and a computer program that is stored in the memory and executable on the processor, wherein the computer program, when executed by the processor, causes the terminal device to perform:
receiving a first input performed by a user on a target icon, wherein the target icon is an icon on at least one first interface; and
in response to the first input, displaying the target icon on a second interface in a case that a target quantity reaches a target value, wherein the target quantity is a quantity of icons displayed in fixed icon placeholders on the second interface, and the target value is a quantity of fixed icon placeholders on the second interface, wherein
after the target icon is displayed on the second interface, P icons on the second interface are located in non-fixed icon placeholders, P is a quantity of target icons, and P is a positive integer greater than 1; wherein
the fixed icon placeholders are display areas for displaying icons in the second interface; the non-fixed icon placeholders are other display areas for displaying icons in the second interface other than the fixed icon placeholders, and in a case that the icons in the second interface are in an editable state, the non-fixed icon placeholders are used for displaying icons;
in a case that an end location of the first input is in an identification range of a first fixed icon placeholder on the second interface, displaying the target icon in the first fixed icon placeholder on the second interface, and displaying a first icon in a first non-fixed icon placeholder, wherein the first icon is an icon displayed in the first fixed icon placeholder before the target icon is displayed in the first fixed icon placeholder; or
in a case that an end location of the first input is not in identification ranges of all fixed icon placeholders on the second interface, displaying the target icon in the first non-fixed icon placeholder on the second interface; wherein
the computer program, when executed by the processor, causes the terminal device to perform:
displaying the target icon in the first non-fixed icon placeholder on the second interface; wherein
the target icon comprises M second icons, the first non-fixed icon placeholder comprises M non-fixed icon placeholders, and M is a positive integer greater than 1; and
the computer program, when executed by the processor, causes the terminal device to perform:
displaying the M second icons in the M non-fixed icon placeholders; and
the computer program, when executed by the processor, causes the terminal device to further perform:
arranging the M second icons in the M non-fixed icon placeholders;
receiving a second input performed by the user on N second icons, wherein the N second icons are icons in the M second icons, N is a positive integer greater than 1, and N is a positive integer less than or equal to M; and
displaying the N second icons in N fixed icon placeholders on a third interface in response to the second input; wherein
an arrangement manner of the N second icons on the third interface is the same as an arrangement manner of the N second icons on the second interface; wherein
an arrangement manner of the N second icons on an interface is an arrangement order between the N second icons and a two-dimensional space layout of the N second icons on the interface.

7. The terminal device according to claim 6, wherein the target icon comprises M second icons, and M is an integer greater than 1; and
the computer program, when executed by the processor, causes the terminal device to further perform:
receiving a third input performed by the user; and
selecting the M second icons on the at least one first interface in response to the third input, wherein
after the M second icons are displayed on the second interface, M icons on the second interface are located in non-fixed icon placeholders.

8. The terminal device according to claim 7, wherein the at least one first interface is one first interface, and an arrangement manner of the M second icons on the second interface is the same as an arrangement manner of the M second icons on the at least one first interface.

9. The terminal device according to claim 6, wherein the computer program, when executed by the processor, causes the terminal device to further perform:
receiving a fourth input performed by the user on a target control on the second interface;
displaying Q interface thumbnails in response to the fourth input, wherein each interface thumbnail is used to indicate one interface, and Q is a positive integer;
receiving a fifth input performed by the user, wherein the fifth input is used to select at least one interface thumbnail from the Q interface thumbnails; and displaying the P icons in fixed icon placeholders on at least one interface in response to the fifth input, wherein the at least one interface is an interface indicated by the at least one interface thumbnail.

10. The terminal device according to claim 6, wherein the computer program, when executed by the processor, causes the terminal device to further perform:
receiving a sixth input performed by the user; and
displaying the P icons in P fixed icon placeholders on a fourth interface in response to the sixth input, wherein the P fixed icon placeholders are fixed icon placeholders of icons that are not displayed before the P icons are displayed on the fourth interface.

11. A non-transitory computer-readable storage medium, wherein the non-transitory computer-readable storage medium stores a computer program, and the computer program, when executed by a processor of a terminal device, causes the terminal device to perform:
receiving a first input performed by a user on a target icon, wherein the target icon is an icon on at least one first interface; and
in response to the first input, displaying the target icon on a second interface in a case that a target quantity reaches a target value, wherein the target quantity is a quantity of icons displayed in fixed icon placeholders on the second interface, and the target value is a quantity of fixed icon placeholders on the second interface, wherein
after the target icon is displayed on the second interface, P icons on the second interface are located in non-fixed icon placeholders, P is a quantity of target icons, and P is a positive integer greater than 1; wherein
the fixed icon placeholders are display areas for displaying icons in the second interface; the non-fixed icon placeholders are other display areas for displaying icons in the second interface other than the fixed icon placeholders, and in a case that the icons in the second interface are in an editable state, the non-fixed icon placeholders are used for displaying icons;
in a case that an end location of the first input is in an identification range of a first fixed icon placeholder on the second interface, displaying the target icon in the first fixed icon placeholder on the second interface, and displaying a first icon in a first non-fixed icon placeholder, wherein the first icon is an icon displayed in the first fixed icon placeholder before the target icon is displayed in the first fixed icon placeholder; or
in a case that an end location of the first input is not in identification ranges of all fixed icon placeholders on the second interface, displaying the target icon in the first non-fixed icon placeholder on the second interface; wherein
the computer program, when executed by the processor, causes the terminal device to perform:
displaying the target icon in the first non-fixed icon placeholder on the second interface; wherein
the target icon comprises M second icons, the first non-fixed icon placeholder comprises M non-fixed icon placeholders, and M is a positive integer greater than 1; and
the computer program, when executed by the processor, causes the terminal device to perform:
displaying the M second icons in the M non-fixed icon placeholders; and the computer program, when executed by the processor, causes the terminal device to further perform:
arranging the M second icons in the M non-fixed icon placeholders;
receiving a second input performed by the user on N second icons, wherein the N second icons are icons in the M second icons, N is a positive integer greater than 1, and N is a positive integer less than or equal to M; and
displaying the N second icons in N fixed icon placeholders on a third interface in response to the second input; wherein
an arrangement manner of the N second icons on the third interface is the same as an arrangement manner of the N second icons on the second interface; wherein
an arrangement manner of the N second icons on an interface is an arrangement order between the N second icons and a two-dimensional space layout of the N second icons on the interface.

12. The non-transitory computer-readable storage medium according to claim 11, wherein the target icon comprises M second icons, and M is an integer greater than 1; and
the computer program, when executed by the processor, causes the terminal device to further perform:
receiving a third input performed by the user; and
selecting the M second icons on the at least one first interface in response to the third input, wherein
after the M second icons are displayed on the second interface, M icons on the second interface are located in non-fixed icon placeholders.

13. The non-transitory computer-readable storage medium according to claim 12, wherein the at least one first interface is one first interface, and an arrangement manner of the M second icons on the second interface is the same as an arrangement manner of the M second icons on the at least one first interface.

14. The non-transitory computer-readable storage medium according to claim 11, wherein the computer program, when executed by the processor, causes the terminal device to further perform:
receiving a fourth input performed by the user on a target control on the second interface;
displaying Q interface thumbnails in response to the fourth input, wherein each interface thumbnail is used to indicate one interface, and Q is a positive integer;
receiving a fifth input performed by the user, wherein the fifth input is used to select at least one interface thumbnail from the Q interface thumbnails; and
displaying the P icons in fixed icon placeholders on at least one interface in response to the fifth input, wherein the at least one interface is an interface indicated by the at least one interface thumbnail.

15. The non-transitory computer-readable storage medium according to claim 11, wherein the computer program, when executed by the processor, causes the terminal device to further perform:
receiving a sixth input performed by the user; and
displaying the P icons in P fixed icon placeholders on a fourth interface in response to the sixth input, wherein the P fixed icon placeholders are fixed icon placeholders of icons that are not displayed before the P icons are displayed on the fourth interface.

* * * * *